United States Patent [19]

Ban

[11] Patent Number: 4,698,563
[45] Date of Patent: Oct. 6, 1987

[54] SEMICONDUCTOR ELECTRIC MOTOR HAVING A ROTARY TRANSFORMER TO EXCITE A ROTOR

[76] Inventor: Itsuki Ban, 3-50-18 Higashi-Ohizumi, Nerima-ku, Tokyo, Japan

[21] Appl. No.: 942,447

[22] Filed: Dec. 16, 1986

[30] Foreign Application Priority Data

Mar. 4, 1986 [JP] Japan .................................. 61-45257

[51] Int. Cl.$^4$ .......................... H02K 29/12; H02P 6/02
[52] U.S. Cl. .................................... 318/254; 318/138; 318/439
[58] Field of Search .......................... 318/138, 254, 439

[56] References Cited

U.S. PATENT DOCUMENTS 3,529,220  9/1970  Kobayashi et al. ............. 318/254 X
4,612,486  9/1986  Ban et al. ............................ 318/254

Primary Examiner—William M. Shoop, Jr.
Assistant Examiner—Bentsu Ro
Attorney, Agent, or Firm—Lorusso & Loud

[57] ABSTRACT

A m-phase semiconductor electric motor comprises an rotary transformer to excite a rotor; a shaft and a bearing for rotatably supporting the rotor; an exciting coil for exciting the rotor magnetic poles; the rotary transformer includes a first and a second soft-ferrite core having magnetic paths and arranged to rotate relative to each other, the first core is coupled to the rotor shaft, the second core is fixed to the motor housing, a primary and a secondary coil are mounted on the second and first cores, respectively; the motor further comprises an oscillator for supplying the primary coil with a high frequency current; an electric circuit for rectifying the output of the secondary coil to energize the exciting coil; a fixed armature having m-phase coils; position detecting means for generating rotor position signals, each of the rotor position signals having positive and negative portions alternating every 180 degrees electrical angle; means for providing a reference voltage for commanding output torque; a multiplier circuit for multiplying the position detecting signal; an armature current detecting circuit for detecting armature current; an armature current control circuit for controlling armature current such that the armature current is cut off to cause magnetic energy in the armature coil to flow back to D.C. source or to restore the armature current depending on the magnitude of the same.

21 Claims, 45 Drawing Figures

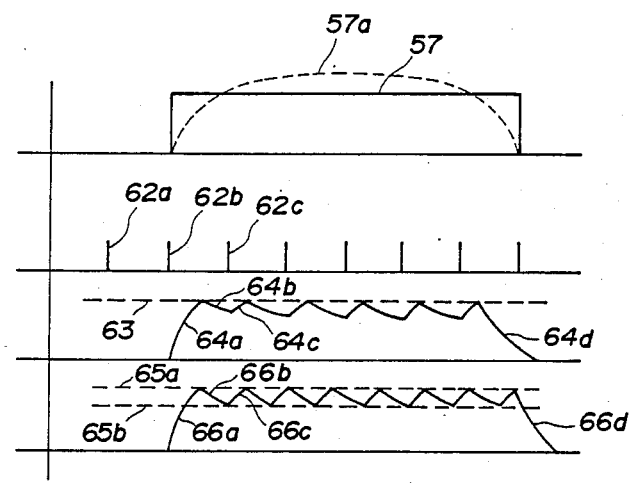

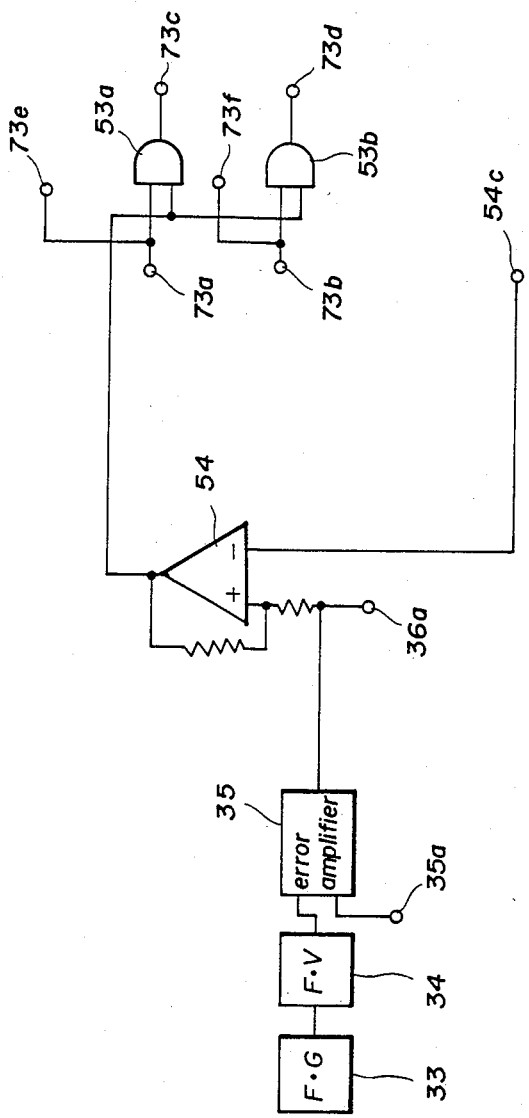

SEMICONDUCTOR ELECTRIC MOTOR HAVING A ROTARY TRANSFORMER TO EXCITE A ROTOR

BACKGROUND OF THE INVENTION

1. Field of the Invention

The present invention relates to a semiconductor electric motor, and particularly relates to a semiconductor electric motor having a rotary transformer for exciting a rotor which is utilized as driving sources requiring a reduced size, a strong output, and a high speed revolution, for example, a driving source for a Silocco fan in a room air conditioning unit, a driving source for an motor driven rotary grinder, a servo mechanism used as a driving source for a robot, or the like.

2. Related Art Statement

In the prior art in the field of electric motors, a typical one is a polyphase commutator motor, and particularly a polyphase commutator motor in which exciting coils are used for field poles because of its large output torque and high speed revolution.

The polyphase commutator motor, however, is disadvantageous in its short years of endurance. In a semiconductor motor (brushless motor), the years of endurance can be prolonged, the output torque is so reduced that the motor cannot be used practically.

Though the output torque can be made large if a magnet of a rare earth element is used as the field poles, the cost is increased so that the motor cannot be used practically. An induction motor is widely used as a high speed motor. The induction motor, however, is disadvantageous in that since an AC power of a frequency of about 400–1000 Hz is used as an input source thereto, the efficiency is low, the size is larger, an inverter is required, and therefore the motor cannot be used for general purposes.

If field poles are excited by exciting coils, the magnetism is strong and the output torque of the motor is large. If the motor is made of the semiconductor type in order to prolong its useful life, the filed poles constitute a rotor and therefore a rotary transformer for exciting the rotor becomes large in size. This is a first problem that the invention is to solve.

A second problem that the invention solves is that, in a semiconductor motor, the number of phases of an armature current control circuit cannot be made large in view of the cost thereof. Accordingly, there is a disadvantage that it takes time for the magnetic energy to be stored and discharged due to turning on/off of the armature current so as to make high speed revolution impossible. Particularly in the case of the semiconductor motor of the field pole exciting type and of large output torque, the above-mentioned disadvantage becomes large because the air gap in the magnetic path of the armature is small and the stored magnetic energy is large. The higher the output torque, the more difficult this problem becomes.

A third problem is that in the motor of the kind as described above the temperature rising is excessive and it is difficult to use a well known Hall element as the position detecting element and therefore it is obliged to use an expensive heat resisting Hall element.

A fourth problem is that the current conduction interval for every phase is set to 180 degrees in terms of electrical angles and current which does not contribute to the output torque is produced at each of the initial and end portions of the current conduction interval to thereby lower the efficiency. Particularly, the loss at the end portion of the current conduction interval is excessive. Accordingly, there is a disadvantage that the efficiency is about half compared with the general three-phase Y-connection motor. Further, there is another disadvantage that reverse-torque is generated by discharge of the stored magnetic energy to thereby cause reduction in output as well as in efficiency.

Owing to the afore-mentioned fact, if the revolutional speed is made up to 3,000 r.p.m. or more, excessive reduction caused in output torque as well in efficiency.

A fifth problem is as follows. If the application voltage is increased to make the revolutional speed high, the output torque also becomes high. As control means for an electric motor, it is desirable to control the two characteristics, that is, the revolutional speed and the output torque, separately from each other. However, the separate control is disadvantageously impossible.

SUMMARY OF THE INVENTION

The above-described drawbacks in the prior art apparatus have been successfully eliminated by the present invention in such a manner as follows.

In order to solve the first problem, according to the invention, the field is excited by using a ferrite rotary transformer utilizing high-frequency AC power of about 50 KHz. In order to make the structure flat, the secondary core of the rotary transformer is accommodated inside the rotor and fixed there.

In order to solve the second problem, according to the invention, the position detecting signal is made not to be a rectangular wave but a substantially sinusoidal wave in which the ampliiude thereof is large at its central portion but gradually increased/decreased at its opposite end portions, or such a waveform obtained by cutting off the 180 degrees (in terms of electrical angles) of the signal at the rear edge portion thereof by predetermined angles, so that a current similarly corresponding to the thus formed position detecting signal is caused to flow in the armature coil by utilizing the inductance of the motor and the high voltage source.

In order to solve the third problem, according to the invention, the position detecting signal is obtained by using the rotary transformer.

The fourth problem can be solved simultaneously with the second problem by the same means as that used to solve the second problem.

The fifth problem can be solved by using means for generating output torque proportional to the voltage of the position detecting signal and means for varying the revolutional speed by varying the amplitude of the source voltage.

Since a high-frequency AC power of about 50 KHz is applied to the primary coil of the rotary transformer in order to solve the first problem, it is possible to make the size small and the output large, and the exciting current for the field poles is obtained for the secondary coil of the rotary transformer. Accordingly, the output torque becomes large. Thus, the magnitude of the output torque can be made to be about equal to that in the case of the motor utilizing a magnet of a rare earth element and the motor can be made to be compact in size and low in cost. Further, since the secondary core of the rotary transformer can be accommodated inside the rotor, it is possible to make the motor large in diameter and in output torque.

Armature current conduction control is performed by using a high voltage power source and a transistor bridge circuit in order to solve the second and the fourth problems. Accordingly, the armature current for every phase is controlled over an interval of 180 degrees in terms of electrical angles such that steep rising of the armature current curve is obtained in the initial period of the interval by making the applied voltage high and steep falling of the armature current curve is obtained in the final period of the same interval by controlling the armature current by utilizing the inductance of the motor and the source voltage of the same. The armature current during the on-state thereof is controlled to a desired value by utilizing the inductance of the armature coil and the source voltage independently of the applied voltage.

Accordingly, the desired armature current value can be maintained without generating reverse-torque even if the output torque is increased by increasing the number of field poles. Thus, it is possible to obtain an eleciric motor which is large in output torque and which can rotates at a high speed.

Since the armature current value is made small in each of the initial and final periods in the current conduction interval, the armature current portion unnecessary for the output torque at the opposite ends of the interval can be suppressed to increase the efficiency and as the result of actual measurement it has been found that the efficiency is about twice as high as the case of rectangular current conduction of a width of 180 degrees in terms of electrical angles. The fifth problem has been also solved simultaneously with the second and fourth problems for the reason as described above.

The rotary transformer is used to solve the third problem so that the S/N ratio (signal-to-noise ratio) of the position detecting signal is large and the waveform can be selected freely.

Thus, it is possible to obtain position detecting signals suitable to obtain an electric motor having high efficiency, large output torque, and a high revolutional speed.

These and other objects of the invention will become apparent from the following description of embodiments thereof when taken together with the drawings.

BRIEF DESCRIPTION OF THE DRAWINGS

FIG. 18(d) is a time chart enlarged in part of FIGS. 18(a) and 18(b) for the detailed explanation;

FIGS. 20(a) and 20(b) are diagrams of the current conduction control circuits for the other one phase of the armature coils shown in FIGS. 13(a) and 13(b) respectively;

DETAILED DESCRIPTION OF THE PREFERRED EMBODIMENTS

Figure 1A:
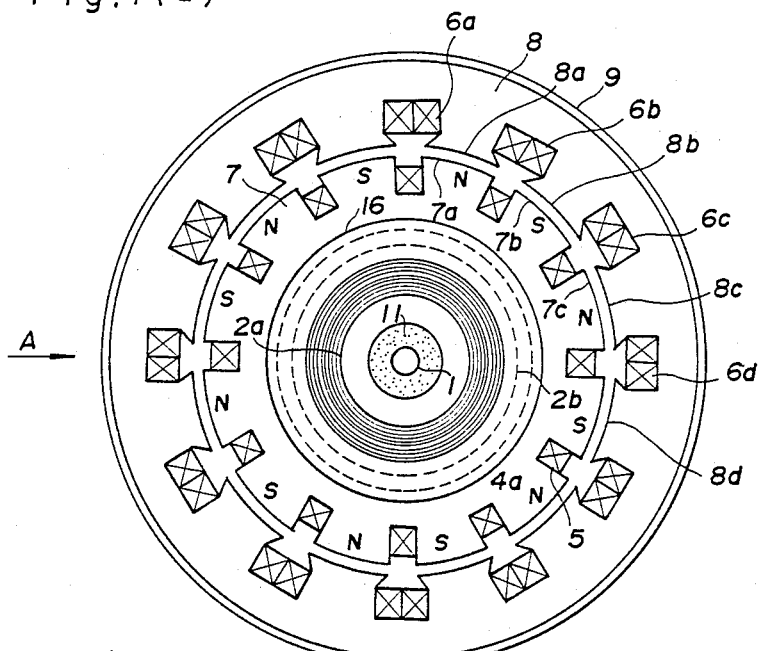
FIG. 1(a) is a front view showing an embodiment of the single-phase motor according to the present invention.

Referring to the drawings, embodiments of the present invention will be described in detail hereunder.

All the angles described hereinafter are expressed by degrees in terms of electrical angles, but expressed merely by degrees with no indication of "in terms of electrical angles".

Embodiment 1

Figure 2:
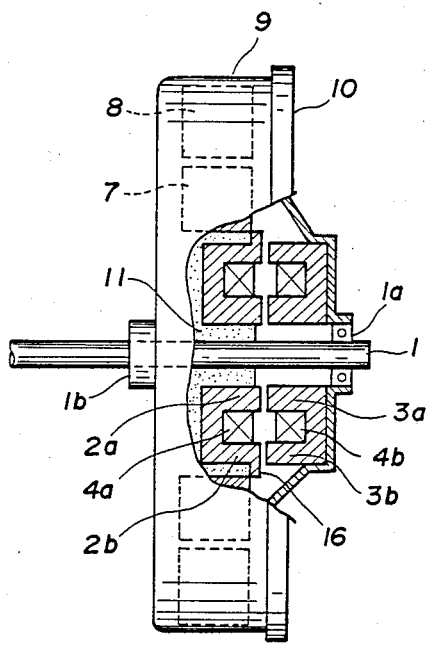
FIG. 2 is a side view of FIG. 1(a) and FIG. 1(b)

Referring to FIGS. 1(a) and 2, a first embodiment according to the present invention will be described hereunder, FIG. 2 being a diagram of FIG. 1(a) viewed in the direction of an arrow A. In this embodiment, the same reference numerals represent the same parts and have the same functions, and therefore repeated explanation is omitted.

In FIGS. 1(a) and 2, a well known fixed armature 8 constituted by a stack of silicon steel plates is provided with slots in which single-phase armature coils 6a, 6b, ... are received. The detail of this state will be described later with reference to FIG. 3.

Outer casings 8 and 10 formed to be cup-like by means of press processing are fittingly fixed with each other at the circumferential portions thereof as illustrated in FIG. 2, and are provided at their central portions with bearings 1b and 1a, respectively, on which a rotary shaft 1 is rotatably supported.

A rotor 7 constituted by a stack of silicon steel plates is provided with slots in which an excitation coil 5 is mounted, and the excitation coil 5 is energized so that magnetic poles 7a, 7b, ... of the rotor 7 are excited alternately to N and S poles as illustrated in FIG. 1(a).

The magnetic poles 7a, 7b ... are opposed to salient poles 8a, 8b, ... through a slight gap therebetween.

A central through hole of the rotor 7 is filled with a plastic material 11 shown by a dotted portion in the drawings so that a pot core structure (made of soft ferrite) constituted by outer and inner cores 2b and 2a and the rotary shaft 1 are embedded in the plastic material 11 so as to fix those members to the rotor 7.

Another pot core structure constituted by outer and inner cores 3b and 3a and arranged in the same manner as the first-mentioned pot core structure is fixed at its bottom surface to the outer casing 10 as illustrated in FIG. 2.

Magnetic-path opened ends of the outer cores 3b and 3b and the inner cores 2a and 3a are opposed to each other through a gap of about 0.22 mm as illustrated in FIG. 2.

Excitation coils 4a and 4b are mounted on the two pot core structures 2a and 2b, and 3a and 3b respectively.

The pair of pot core structures constitute a well known rotary transformer. The thus arranged rotary transformer will be described in detail hereunder with reference to FIGS. 4(a), 4(b), and 4(c).

Figure 4A:
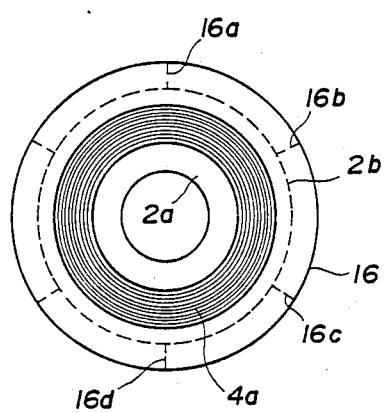
FIGS. 4(a), 4(b) and 4(c) are views for explaining the rotary transformer and position detecting coils shown in FIG. 1(a)

In FIG. 4(a), the outer core 2b is provided with a radially outwards projecting flange 16 which is constituted by protrusions 16a, 16b, ... shown by dotted lines in the drawing and recess portions therebetween.

Figure 4B:
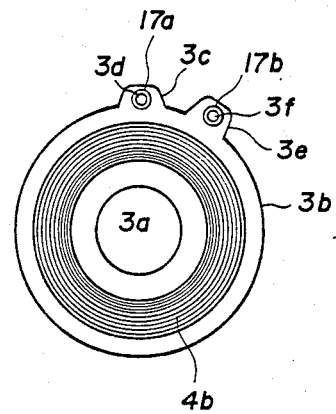

In FIG. 4(b), the outer core 3b, on the other hand, is provided with radially outward protrusions 3c and 3e from which columns 3d and 3f made of soft ferrite are axially projected respectively.

Figure 4C:
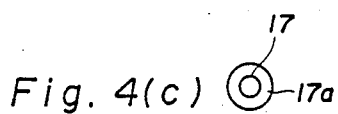

Columns 3d and 3f are fitted respectively into central holes 17 of the coils 17a and 17b and opposed to the outwards projecting flange 16 of FIG. 4(a). FIG. 4(c) shows only the coil 17a.

Thus, when the inner core 2a is rotated together with the rotor 7, magnetic flux passing through the columns 3d and 3f varies to thereby generate induced outputs in the coils 17a and 17b. The induced outputs are used as position detection outputs. Thus, the arrangement constitutes a well known resolver.

Figure 7B:
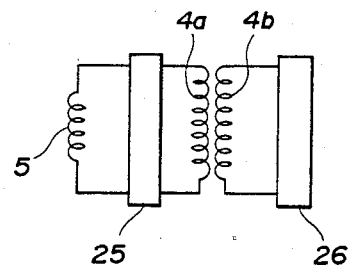
FIG. 7(b) is a diagram of the current conduction control circuit for the rotary transformer and the exciting coil shown in FIGS. 1(a) and 1(b)

As shown in FIG. 7(b), the primary excitation coil 4b is supplied with an AC voltage of about 50 KHz from a transistor oscillator circuit 26. As such an oscillator circuit as described above, for example, an oscillator circuit for an electronic light emitter or strobo lighting device can be used as it is, and in this case, the primary coil 4b is used as an oscillation coil.

After rectified by a rectifier circuit 25 fixed to the rotor 7, the output of the secondary excitation coil 4a is applied to the excitation coil 5 of FIG. 1(a) which is received staggeringly in the slots of the rotor 7 so as to excite the magnetic poles 7a, 7b, ... alternately to N and S poles as will be described in detail later with reference to FIG. 3(a).

Means for the mass production of the rotor 7 are well known, and the strength of the magnetic filed of the rotor 7 is quite the same as that of generally used commutator motors of the field excitation type. Therefore, the magnetic field of the rotor 7 is made to have strength three times or more as strong as that of a ferrite magnet, so that the output torque can be increased.

As described above, in the pot core structures, the magnetic-path opened ends of the inner cores 2a and 3a and the outer cores 2b and 3b are opposed to each other through a gap of 0.2–0.5 mm, and the power transmission efficiency is 60% or more.

A diameter of about 25 mm of the pot core structure suffices to transmit electric power of 10 watts because a high-frequency AC voltage is used for energizing the primary coil 4b. Accordingly, the present invention can be applied to a relatively compact electric motor having an output of several hundreds watts.

Next, referring to an development shown in FIG. 3(a), description will be made in detail as to the arrangements of the rotor 7 and the armature 8.

Figure 3A:
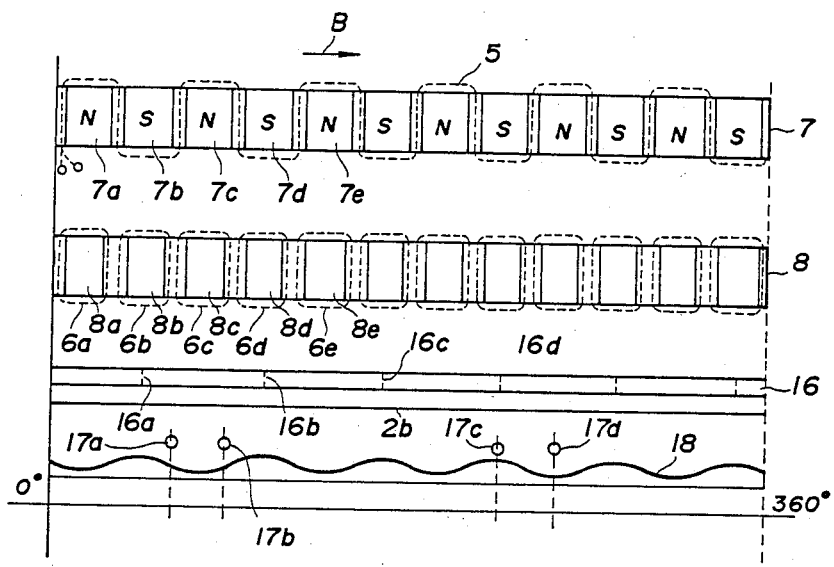
FIG. 3(a) is a development of the armature and rotor of FIG. 1(a)

In the rotor 7, the slots and the twelve magnetic poles 7a, 7b, ... respectively having widths equal to each other are provided, and the excitation coil 5 is staggeringly received in the slots as shown by a dotted line, as shown in FIG. 3(a).

In the armature 8, on the other hand, the slots and the twelve salient poles 8a, 8b, ... respectively having widths equal to each other are provided, and the armature coils 6a, 6b, ... are received in the slots formed between the salient poles 8a, 8b, ... respectively.

Although the number of the magnetic poles 7a, 7b, . . . is twelve in this embodiment, the number is not limited to this but may be four, eight, twelve, . . . .

Further, the same purpose can be achieved even if an armature coil is staggeringly received in the slots of the armature 8 in the same manner as the excitation coil 5 of the rotor 7, in place of the armature coils 6a, 6b, . . . .

Although the motor of the internally rotary type is illustrated in this embodiment, the embodiment may be applied to a motor of the externally rotary type.

In FIG. 3(a), the third development of the outer core 2b shows that the outwards projecting flange 16 is provided with the protrusions 16a, 16b, . . . formed at a pitch of 180 degrees, and the lowermost development shows the side view of the protrusions 16a, 16b, . . . which forms a substantially sinusoidal curvee surface 18.

The coils 17a and 17b are fixed to the fixed armature at the positions shown in FIG. 3(a), so that the position detecting outputs are modulated by the frequency of 50 KHz corresponding to the curved surface 18 as the rotor 7 is rotated in the direction of an arrow B of FIG. 3(a). In a time chart of FIG. 8, curves 37 and 38 show the respective waveforms of the position detecting outputs of the coils 17a and 17b.

Figure 7A:
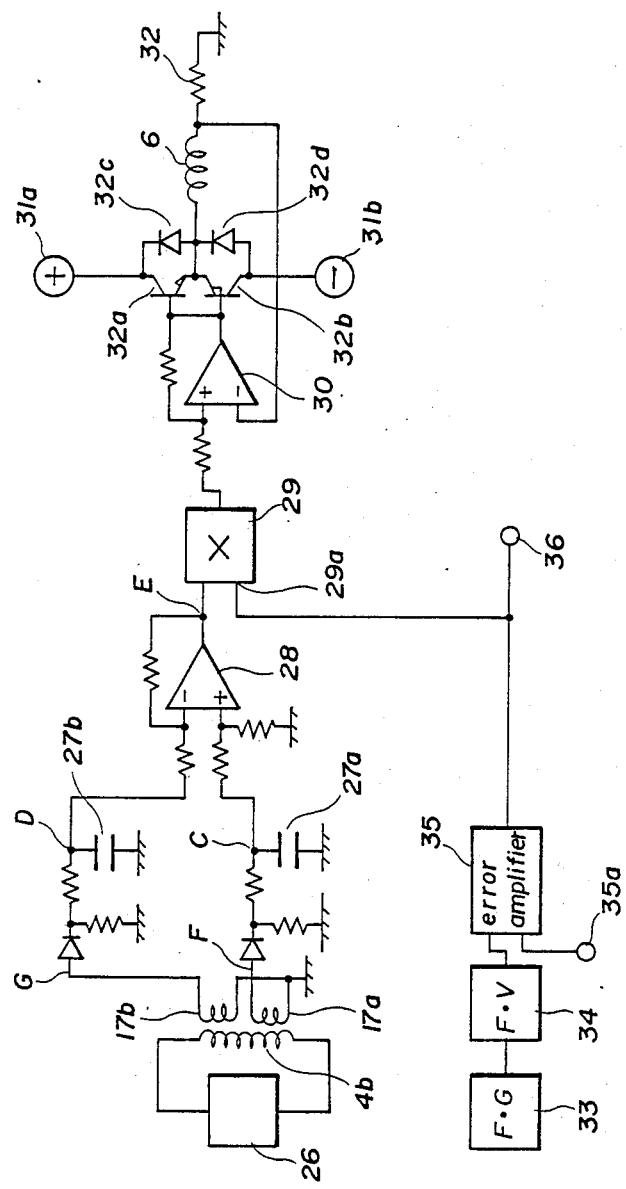
FIGS. 7(a) and 7(c) are diagrams of the current conduction control circuits for one phase of the armature coils shown in FIGS. 1(a) and 1(b) respectively.

In FIG. 7(a), the 50 KHz high-frequency output of the oscillator circuit 26 shown in FIG. 7(b) is applied to the primary coil 4b, so that magnetic flux generated by the primary coil 4b generates induced outputs in the coils 17a and 17b.

Figure 8:
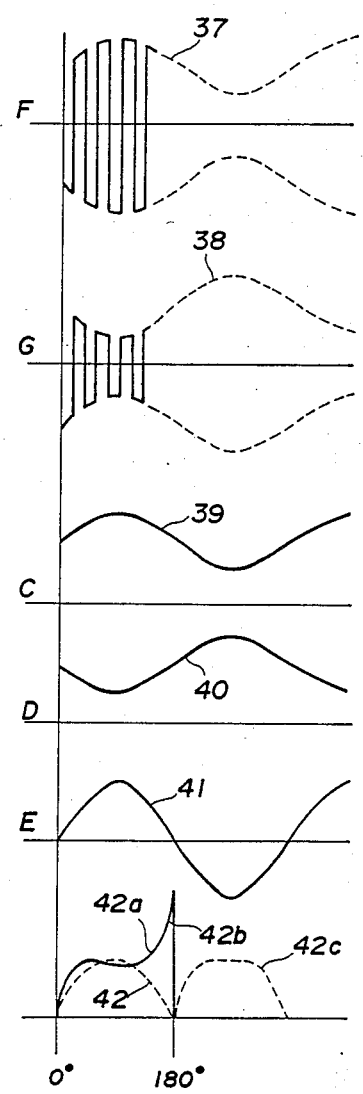
FIG. 8 is a time chart of the output of position detection and the armature current when the circuits of FIGS. 7(a) and 7(c) are used.

The induced output in the coil 17b is rectified by a diode and a high-frequency component of the output is eliminated by a capacitor 27b. A cure 40 of FIG. 8 shows the waveform of the output at a point D in FIG. 7(a).

The induced output in the coil 17a, on the other hand, is rectified by another diode and a high-frequency component of this output is eliminated by a capacitor 27a. A curve 39 of FIG. 8 shows the waveform of the output at a point C in FIG. 7 (a).

As described above, the curves 37 and 38 of FIG. 8 shows the waveforms of the outputs at points G and F in FIG. 7(a) respectively, and a curve 41 shows the waveform of the output of an operational amplifier 28, that is, the output at a point E in FIG. 7 (a). The width of a half period of the curve 41 is substantially equal to that of the salient pole of the armature or the magnetic pole of the rotor 7.

The input at the point E is multiplied by the input to an input terminal 19a of a multiplier 29, and the output of the multiplier 29 is applied to a non-inverted input terminal of a comparator 30.

Therefore, when the input at the point E takes a value in the positive portion of the curve 41 a transistor 32a is turned on, and on the contrary, when the input at the point E takes a value in the negative portion of the curve 41 another transistor 32b is turned on.

In FIG. 7(a), the armature coil 6 is energized to pass a current rightward or leftward in the drawing in response to the turning-on of the transistor 32a or 32b respectively because a voltage at the intermediate position between positive and negative voltage terminals 31a and 31b is selected to have an ground level.

The armature coil 6 is formed by connecting the armature coils 6a, 6b, . . . of FIG. 3(a) in series or parallel to each other.

The voltage drop across a resistor 32 is proportional to the armature current, and applied to an inverted input terminal of the comparator 30.

Next, referring to FIG. 6(a), description will be made as to the current conduction of the armature coil 6 in response to the rising portion of the input to the comparator 30 corresponding to a value in the positive portion of the curve 41 in the FIG. 8.

Figure 6A:
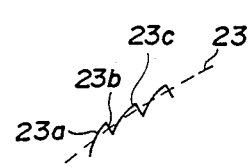
FIGS. 6(a) and 6(b) are graphs showing the rising and falling, respectively, of the armature current controlled through the armature current control by using the inductance of the armature coil.

In FIG. 6(a), a dotted line 23 shows the above-mentioned rising portion of the input to the comparator 30. The armature current flowing in the armature coil 6 increases along a curve 23a because the transistor 32 is is in its on-state, so that the input voltage to the inverted input terminal of the comparator 30 increases. When the input voltage exceeds the positive hysteresis of the comparator 30 the output of the comparator 30 becomes low in its level (hereinafter simply referred to as "low") to thereby turn-off the transistor 32a.

As a result, the armature current is cut off, and at this time, a current due to the magnetic energy stored in the armature coil 6 flows from the coil 6 to the same coil 6 through the resistor 32→the ground→the negative terminal 31b→a diode 32d. This current flows along a curve 23b in FIG. 6(a).

When the current decreases the input voltage to the inverted input terminal of the comparator 30 decreases. If the input voltage becomes lower than the negative hysteresis of the comparator 30, the output of the comparator 30 becomes high in its level (hereinafter simply referred to as "high") to thereby turn-on the transistor 32a, so that the current is increased along a curve 23c of FIG. 6(a). Thus, through such a cycle, the armature current increases along the dotted line 23.

Figure 6B:
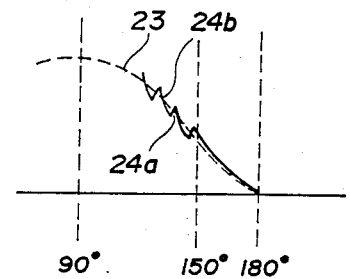

Next, when the input voltage to the comparator 30 falls, the armature current decreases along a dotted line 23 in FIG. 6(b).

If the transistor 32a is turned off, the armature current decreases along a curve 24b. When the input voltage to the inverted input terminal of the comparator 30 becomes lower than the negative hysteresis of the comparator 30, the output of the comparator 30 becomes "high" to hereby turn-on the transistor 32a, so that the current is increases along a curve 24a. Thus, while repeating such a cycle, the armature current decreases along the dotted line 23 in FIG. 6(b).

As will be understood from the foregoing explanation, the armature current increases and decreases along the dotted line 23 similarly thereto.

Similarly to this, the transistor 32b is turned on/off in response to the input to the comparator 30 corresponding to the negative portion of the curve 41 in FIG. 8, that is, the armature coil 6 is energized in the negative direction, and the armature current flows along the curve 41 similarly thereto.

When the transistor 32b is turned off, the current due to the magnetic energy stored in the armature coil 6 flows for the coil 6 to the same coil 6 through the armature coil 6→a diode 32c→the positive terminal 31a→the ground→the resistor 32.

If a setting voltage is applied to a terminal 36, the input voltage to the comparator 30 can be changed by the multiplier 29 corresponding to the setting voltage so that the armature current can be increased/decreased correspondingly. Thus, the output torque can be controlled.

Thus, the armature current can be made to correspond to the curve 41 in FIG. 8, so that the motor can be driven as a single-phase motor in this embodiment.

That is, the rotor 7 is driven to rotate in the direction of the arrow B of FIG. 3(a).

In order to cause the motor to perform self-starting, it is necessary to employ well-known means. In this embodiment of FIG. 1(a), the gap between the salient poles 8a, 8b, ... and the magnetic poles 7a, 7b, ... is made uneven to thereby cause cogging torque to move such that positive cogging torque is generated at the dead point of the torque, to thereby enable the motor to perform self-starting. Alternatively, it is possible to cause the motor to perform self-starting by such a well known means that the dead point of torque is shifted by the provision of a permanent magnet.

Figure 7C:
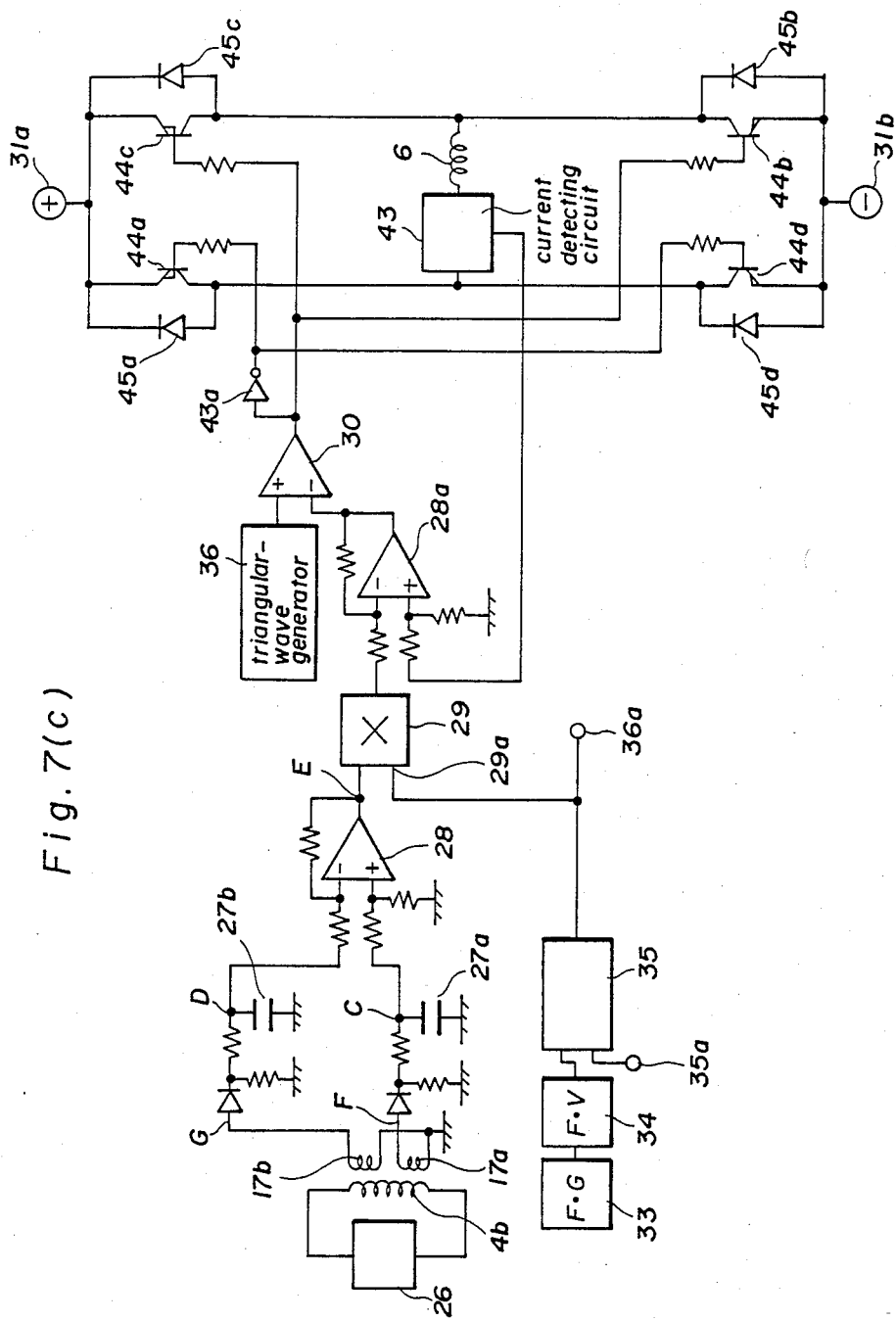

In FIGS. 7(a) and 7(c), an FG frequency generator) 33, an FV (frequency-to-voltage) converter 34, and an error amplifier 35 are provided for performing constant-speed control.

The revolutional speed of the motor according to the present invention is converted into a frequency of an electric pulse by utilizing an encoder in the FG 33, and the thus obtained frequency is further converted into a voltage signal by the FV converter 34. A reference voltage for instructing a desired speed is being applied to a terminal 35a.

If the revolutional speed of the rotor increases, the output voltage of the error amplifier 35 falls, the output voltage of the comparator 30 decreases, and the output torque decrease, so that the revolutional speed becomes a value balanced with the load torque.

When the revolutional speed of the rotor 7 decreases, on the contrary, reverse control is performed to thereby hold a desired speed.

As apparent from the foregoing explanation, since the armature current is controlled by means of the inductance of the armature coil 6, so that Joule loss of the transistor can be effectively suppressed. Further, the efficiency is made high because the armature current has such a waveform as shown by the curve 41 in FIG. 8. This operation will be described in detail hereunder.

In FIG. 8, curves 42a and 42b show the waveform of an armature current of a general single-phase electric motor in an interval of 180 degrees.

The current is not controlled over the period of the curves 42a and 42b. Accordingly, in the initial stage of current conduction, the current is gradually increased owing to the inductance of the armature coil 6, while in the middle stage, the current is decreased because the applied voltage is slightly decreased by the counter electromotive force induced in the armature coil. In the last stage, the applied voltage is increased because the counter electromotive force becomes small so that the current is increased steeply along the curve 42b. The peak value on the curve 42b is substantially equal to a current value in the period of starting the motor. In this period, no output torque is generated and only the Joule loss is generated in the armature coil 6, so that the efficiency of the motor is exceedingly decreased. If a motor having a magnetic field of twelve magnetic poles like this embodiment is rotated at a revolution speed of 3,000 r.p.m., the Joule loss is equal to a value in the case where the motor is started with a revolutional speed of 3,000×12=36,000 r.p.m. Therefore, generally, the maximum efficiency is about 20%.

In the motor according to the present invention, however, the current has a waveform shown by a dotted line 42 in FIG. 8, which is similar to that shown by the curve 41, so that an effect is that the Joule loss is decreased in the early and last periods, particularly, excessively decreased in the last period. Accordingly, a feature is that the efficiency is remarkably increased up to the maximum value of about 60%.

In order to increase the output torque, it is necessary to increase the number of magnetic poles of FIG. 1(a). In the case where the number of magnetic poles of FIG. 1(a) is increased, the gradient of the rising portion of the armature current is made gentle owing to the magnetic energy stored in the salient poles 8a, 8b, ... of FIG. 1(a) when the revolutional speed is maintained at a desired value, and even after the stoppage of the current conduction the current due to the discharge of the stored magnetic energy continues to flow beyond 180 degrees through the diodes 32c and 32d of FIG. 7(a) to generate reverse-torque. Thus, the armature current hardly flows and reverse-torque is generated, so that the output as well as the efficiency are reduced.

In the motor according to the present invention, however, since the voltage applied to the motor is made high so that the gradient of the rising portion of the armature current curve 42 in the initial period thereof is made steep, the current conduction is made to have a waveform similar to that of the curve 41, that is, the output waveform of the multiplier 29 of FIG. 7(a) so that the interval of current conduction is made to be 180 degrees and that reverse-torque is prevented from being generated.

Thus, the foregoing disadvantage is eliminated, so that a single-phase semiconductor electric motor having a high speed and high torque is obtained. Further, there is such an effect that the efficiency of the motor is increased because a large armature current is prevented from flowing in the last period of current conduction. As described above, in the motor according to the present invention, the magnetic poles 7a, 7b, ... of the excitation type are used in the rotor 7 without using a ferrite magnet so that the strength of magnetism of the field poles is several times as large as that of the ferrite magnet and the output torque is increased. On the other hand, a large quantity of magnetic energy is stored because the magnetic paths of the salient poles 8a, 8b, ... are closed by the rotor 7.

Consequently, it is unavoidable to use means for compulsorily controlling the armature current by using the inductance of the armature coil 6 so as to make the the waveform of the armature current similar to the output waveform of the multiplier 29 of FIG. 7(a).

If the waveform of the protrusions shown by the curve 18 of FIG. 3(a) is changed so as to change the output waveform of the operational amplifier 28 of FIG. 7(a) to be similar to the wave-form shown by the dotted line 42c in FIG. 8, the output torque and the efficiency can be further increased because the width of a central portion of the dotted line curve 42c where large torque is generated becomes large.

Although the position detecting output is obtained by utilizing the rotary transformer in the embodiment of FIG. 1(a), it is possible to attain the same purpose by utilizing a Hall element. Means utilizing such a Hall element will be described in reference to FIGS. 5(a) and 5(b).

Figure 5A:
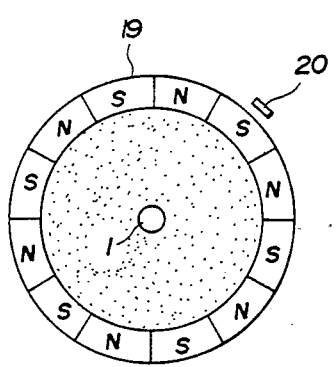
FIG. 5(a) is a view for explaining the case where a magnet and a Hall element are used as the position detector in the embodiments shown in FIGS. 1(a) and 1(b)

In FIG. 5(a), a ferrite ring magnet 19 is fixed to the rotary shaft 1 through a plastic material shown by a dotted portion so as to be rotated together with the rotary shaft 1. The outer circumference of the magnet 19 is magnetized to form twelve N and S magnetic poles at a regular pitch. A Hall element 20 is opposed to one of the magnetic poles.

Figure 5B:
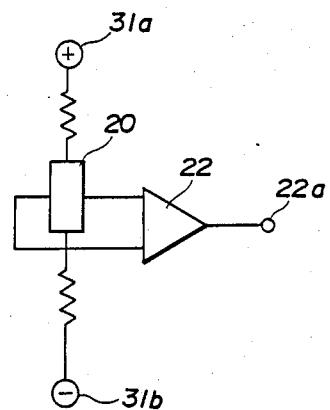
FIG. 5(b) is a diagram of an electric circuit including the Hall element shown in FIG. 5(a) and the periphery thereof.

In FIG. 5(b), the output of the Hall element 20 is amplified by a differential amplifier 22. When the Hall element 20 comes in opposition to an N pole, a positive voltage proportional to the strength of the magnetic field is produced from the differential amplifier 22. When the Hall element 20 is opposite to an S pole, on the contrary, a negative voltage proportional to the strength of the magnetic field is produced from the differential amplifier 22. Therefore, the output waveform at a terminal 22a can be made similar to the waveform shown by the curve 41 in FIG. 8. Accordingly, the same purpose can be achieved by applying the output at the terminal 22a of FIG. 5(b) to the one input terminal of the multiplier 29 in place of application of the output of the operational amplifier 28 of FIG. 7(a).

Although the cores 2a and 2b, and 3a and 3b of the rotary transformer of FIG. 2 are axially arranged on the rotary shaft 1 in this embodiment, the same purpose can be achieved even if they are arranged radially.

Figure 9A:
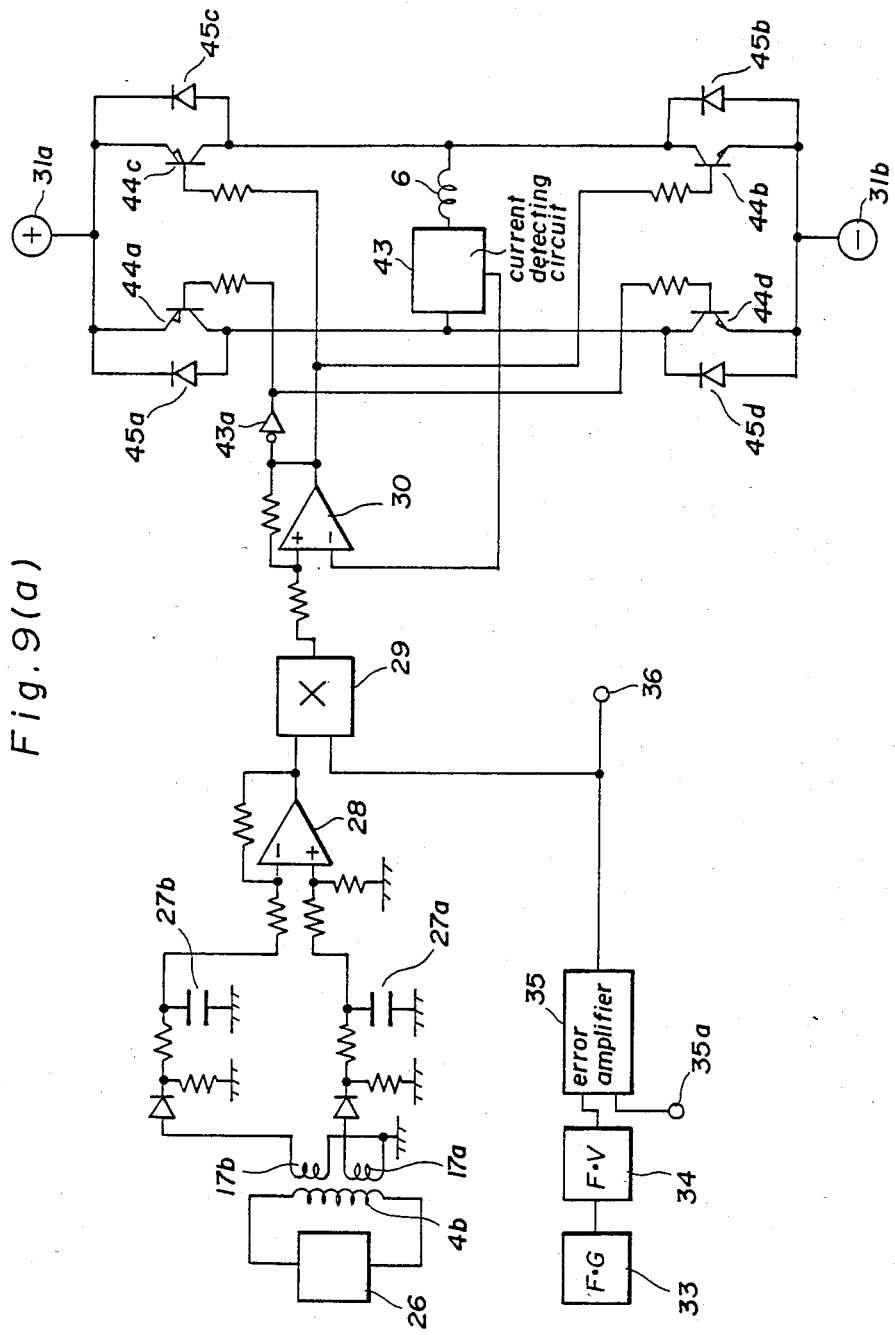
FIGS. 9(a) and 9(b) are diagrams of the current conduction control circuits for the other phase of the armature shown in FIGS. 1(a) and 1(b) respectively.

Next, referring to FIG. 9(a), description will be made as to a modification of the current conduction means. In the modification of FIG. 9(a), the same parts as those in FIG. 7(a) are correspondingly referenced and have the same effects and functions. Therefore, the input waveform applied to the non-inverted input terminal of a comparator 30 is similar to the waveform of the curve 41 in FIG. 8.

Transistors 44a, 44b, 44c, and 44d constitute a well-know transistor bridge circuit together with an armature coil 6.

When the armature coil 6 is energized to rightward or leftward in the drawing, a positive or negative voltage proportional to the current is produced from a well-known armature current detecting circuit 43 respectively and applied to the inverted input terminal of the comparator 30.

In the case where the input to the non-inverted input terminal of the comparator 30 takes a value in the positive portion of the curve 41 of FIG. 8, the transistor 44a is turned on through an inverter 43a, and the transistor 44d is maintained off.

At this time, the transistor 44c is turned off while the transistor 44b is turned on because the output of the comparator 30 takes a positive value proportional to the curve 41.

As a result, the armature coil 6 is energized rightward in the drawing. Thereafter, when the current value is increased, the input voltage to the inverted input terminal of the comparator 30 is increased, so that the output of the comparator 30 becomes "low" to thereby turn off the transistor 44b.

Consequently, the current conduction of the armature coil 6 is stopped, and the stored magnetic energy is discharged from the coil 6 into the same through a diode 45c, a power source terminal 31a, a power source, a power source terminal 31b, and a diode 45d, so that the input voltage to the inverted input terminal of the comparator 30 is decreased. When the input voltage to the inverted input terminal of the comparator 30 becomes lower than that to the non-inverted input terminal of the same, the output of the comparator 30 becomes "high" to thereby turn-on the transistors 44a and 44b again, so that the armature current begins to increase.

The foregoing cycle of increasing/decreasing of the armature current is quite the same as that in the case of FIG. 7(a), and therefore the waveform of the armature current is similar to that of the curve 23, that is, the curve 41 of FIG. 8 as described above with reference to FIGS. 6(a) and 6(b).

This applies to the case where the input to the non-inverted input terminal of the comparator 30 takes a value in the negative portion of the curve 41 in quite the same manner. Thus, although the on/off state of the transistors 44c and 44d are alternately repeated so that the armature current is changed in direction, the armature coil 6 is compulsorily energized along the curve 41. At this time, the stored magnetic energy is discharged through diodes 45a and 45b.

In the circuit for discharging the stored magnetic energy through the diodes 45a, 45b, . . . , a power source is included and the magnetic energy is caused to flow back into the power source. Therefore, the gradient of the curve 24b of FIG. 6(b) is made to be further vertical to thereby make it possible to rapidly decrease the armature current along the wave 23 even if the gradient of the falling portion of the curve 23 is steep. The gradient of the rising portion of the armature current, on the other hand, can be made steep by making the voltage across the terminals 31a and 31b high so that an effect is that the armature current can be controlled along the curve 41 even when the motor is rotated at a high speed. If the source voltage is high, the stored magnetic energy is discharged rapidly, so that an effect is that the armature current is decreased rapidly.

The output torque control by means of the input voltage to the terminal 36 as well as the constant speed control by means of the electric circuits 33, 34, and 35 can be performed in the modification shown in FIG. 9(a) in the same manner as in the embodiment of FIG. 7(a).

Next, referring to FIG. 7(c), description will be made as to another modification of the current conduction means. In the modification of FIG. 7(c), the same parts as those in FIG. 7(a) are correspondingly referenced and have the same effects and functions.

The output of an operational amplifier 28 is applied to a multiplier 29 and multiplied therein by an input to the input terminal 29a of the same multiplier 29, and the output of the multiplier 29 is applied to the inverted input terminal of an operational amplifier 28a. The output representing a difference between the output of the multiplier 29 and the output of a current detecting circuit 43 is produced from the operational amplifier 28a and applied to a comparator 30. In the comparator 30, a triangular wave produced from a triangular-wave generator 36 and the output of the operational amplifier 28a are compared with each other.

Next, referring to a time chart of FIG. 12, description will be made as to the operations of the triangular-wave generator 36 and the comparator 30 of FIG. 7(c).

Figure 12:
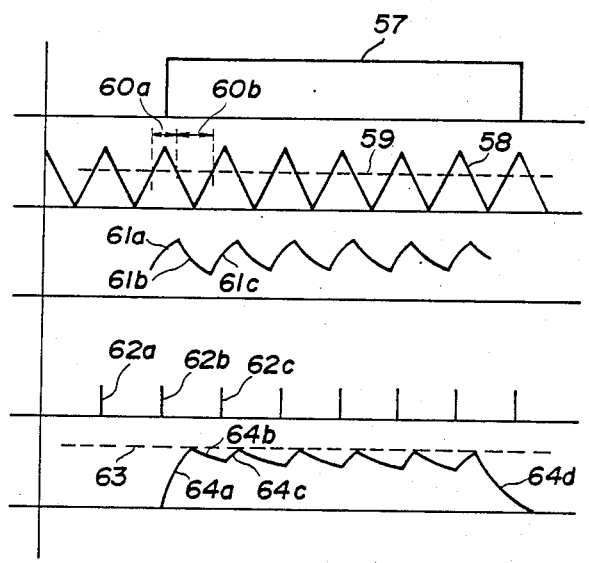
FIG. 12 is a time chart of the position detection signal and the armature current when the circuits of FIGS. 9(b) and 9(c) are used.

In FIG. 12, a curve 58 shows the output waveform of the triangular-wave generator 36, and a dotted line 59 shows the output of the operational amplifier 28a.

In the operational amplifier 28a, the output of the current detecting circuit 43, which is arranged so as to produce a positive or negative output proportional to the armature current when the armature coil 6 is energized rightward or leftward in the drawing respectively, is compared with the output of the multiplier 29. When the output of the current detecting circuit 43 is larger than the output of the multiplier 29, the level of the dotted line 59 rises, and vice versa.

Therefore, a transistor 44a is turned on through an inverter 43a and a transistor 44b is turned on in an interval shown by an arrow 60a in FIG. 12 because the output of the comparator 30 becomes "high", so that the armature current is increased along a curve 61a. The transistors 44a and 44b are turned off in an interval shown by an arrow 60b because the output of the comparator 30 becomes "low".

The magnetic energy stored in the armature coil 6 is discharged from the coil 6 to the same through a diode 45c, a power source terminal 31a, a power source, a power source terminal 31b, and a diode 45d, because the voltage due to the stored magnetic energy larger than the source voltage. A curve 61b of FIG. 12 shows the discharge current. At this time, the armature coil 6 is not energized leftward in the drawing because the voltage across the armature coil 6 is larger than the source voltage although transistors 44e and 44d are in their on-state.

Thereafter, the transistors 44a and 44b are turned on, so that the armature coil 6 is energized in such a manner as shown by a curve 61c. As described above, the armature current is increased when the dotted line 59 is lowered, and vice versa.

Next, referring to FIGS. 6(a) and 6(b), description will be made as to current conduction of the armature coil 6 owing to the rising portion of the curve 41 of FIG. 8 when the output of the operational amplifier 28a takes a value in the positive portion of the curve 41. The armature coil 6 is constituted by serially or parallelly connected armature coils 6a, 6b, . . . of FIGS. 1(a) and 3(a).

The dotted line 23 of FIG. 6(a) shows the foregoing rising portion of the input voltage to the inverted input terminal of the operational amplifier 28a. The armature current is increased along the curve 23a because the transistors 44a and 44b are in the on-state so that the input voltage to the non-inverted input terminal of the operational amplifier 28a is made high, and the output of the operational amplifier 28a is made high. As described above with reference to FIG. 12, the armature current is increased as a whole along the dotted line 23 while being slightly increased and decreased as shown by the curves 23a, 23b, 23c, . . . through the turning on/off operations of the transistors 44a and 44b, that is, the mean value of the armature current is increased.

First, the armature current is increased in the foregoing cycle along the dotted line 23 of FIG. 6(a). Next, when the input voltage to the operational amplifier 28a is lowered, the armature current is decreased along the dotted line 23 of FIG. 6(b).

When the transistors 44a and 44b are turned off, the armature current is decreased along the curve 24b. Thereafter, when the input voltage to the non-inverted input terminal of the operational amplifier 28a is lowered, the output of the operational amplifier 28a is also decreased, so that the armature current is decreased as a whole along the dotted line 23 while being repeatedly slightly increased and decreased along the curve 24b, 24a, . . . . At this time, it is necessary to make the gradient of the falling portion at the curve 24b larger than that of the dotted line 23.

To this end, as described above, it is necessary to increase the energy for charging the power source, and therefore it is necessary to make the applied voltage high. According to the present invention, however, the output torque, and hence the armature current, is changed along the curve 41 of FIG. 8. Accordingly, it is possible to desirably adjust the output torque by changing the input voltage to the terminal 36a. This is an important feature of the present invention.

Thus, according to the present invention, it is possible to obtain an electric motor having a high speed and high torque.

Similarly to the above, in the case where the output of the operational amplifier 28a takes a value in the negative portion of the curve 41 of FIG. 8, the turning-on of the transistors 44c and 44d is controlled by the output of the operational amplifier 28a to thereby energize the armature coil 6 in the reverse direction, so that the armature current flows along the curve 41 similarly thereto.

When the transistors 44c and 44d are turned off, a current due to the magnetic energy stored in the armature coil 6 flows from the armature coil 6 to the same through the diode 45a→the positive terminal 31a→the power source→the negative terminal 31b→the diode 45b.

If a setting voltage is applied to the multiplier 29 through the terminal 36a, the input voltage to the operational amplifier 28a can be changed corresponding to the setting value by the multiplier 29. Accordingly, the armature current can be increased/decreased corresponding to the setting value, and therefore the output torque can be controlled.

Thus, the armature current can be made to correspond to the curve 41 in FIG. 8, so that the motor can be driven as a single-phase motor in this embodiment. That is, the rotor 7 is driven to rotate in the direction of the arrow B of FIG. 3(a).

In FIGS. 7(a) and 7(c), an FG (frequency generator) 33, an FV (frequency-to-voltage) converter 34, and an error amplifier 35 are provided for performing constant-speed control.

The revolutional speed of the motor according to the present invention is converted into a frequency of an electric pulse by utilizing an encoder in the FG 33, and the thus obtained frequency is further converted into a voltage signal by the FV converter 34. A reference voltage for instructing a desired speed is being applied to a terminal 35a.

If the revolutional speed of the rotor increases, the output voltage of the error amplifier 35 falls, the output voltage of the operational amplifier 28a decreases, and the output torque decrease, so that the revolutional speed becomes a value balanced with the load torque.

When the revolutional speed of the rotor 7 decreases, on the contrary, reverse control is performed to thereby hold a desired speed.

As apparent from the foregoing explanation, since the armature current is controlled by means of the inductance of the armature coil 6, so that Joule loss of the transistor can be effectively eliminated. Further, the efficiency is made high because the armature current has such a waveform as shown by the curve 41 in FIG. 8, similarly to the embodiment of FIG. 7(a).

Embodiment 2

In FIG. 8, description has been made above such that the curve 41 shows the position detecting signal instructing the curve of the armature current. Though the curve 41 has a symmetrical form, it is not always necessary to be so.

Figure 10:
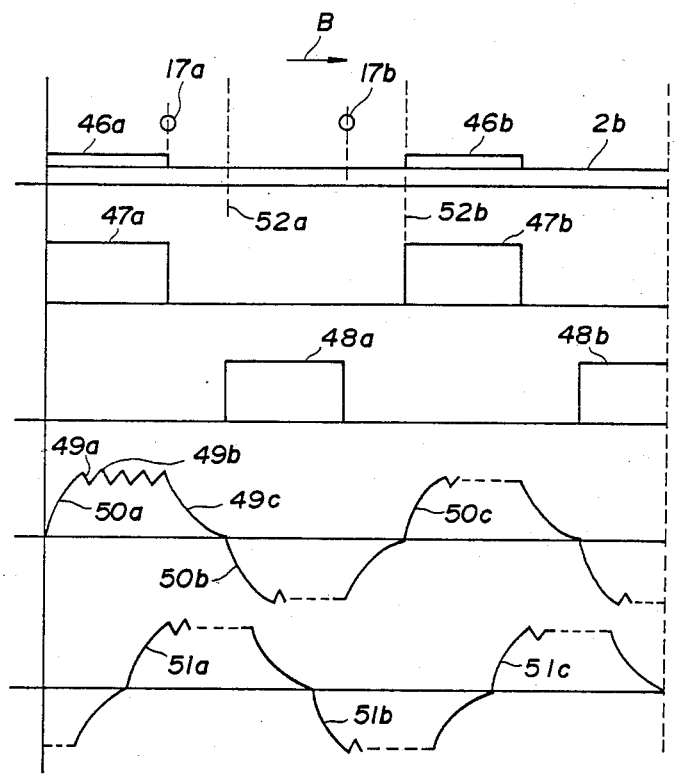
FIG. 10 is a time chart of the position detection signal and the armature current when the circuit of FIG. 9(b) is used.

Referring to the time chart of FIG. 10, description will be made as to an embodiment of asymmetrical current conduction means according to the present invention. In FIG. 10, the uppermost diagram shows a development of protrusions 46a, 46b, . . . provided on the outer surface of the core 2b illustrated in each of FIGS. 1(a) and 4(a). The protrusions 46a, 46b, . . . are provided instead of the curved surface 18 and are opposed to coils 17a and 17b.

Each of the intervals from the starting point to a dotted-line 52a and from the dotted line 52a to a dotted line 52b selected to be 180 degrees. Accordingly, each width of the protrusions is selected to be 120 degrees. Each interval between two adjacent protrusions is therefore selected to be 240 degrees. Description will be made by using the circuit shown in FIG. 11 in addition to FIG. 10.

Since the induced output is the largest when the coils 17a and 17b are opposed to the protrusions 46a and 46b respectively, when a rotor 7, and hence the core 2b, rotates in the direction of an arrow B in FIG. 10, the input to an upper one (in the drawing) of the input terminals of an AND 53a successively takes the values as shown by curves 47a, 47b, . . . and the input to an upper one (in the drawing) of the input terminals of an AND 53b takes the values as shown by curves 48a, 48b, . . . .

When the output of the AND 53a is "high", a transistor 44a is turned on owing to its base input applied through an inverter and a transistor 44b is also turned on at the same time because a "high" input is applied to the base thereof. Accordingly, an armature coil 6 is energized rightward in FIG. 11.

When the output of the AND 53b is "high", a transistor 44c is turned owing to its base input applied through another inverter and a transistor 44d is also turned on at the same time because a "high" input is applied to the base thereof. Accordingly, the armature coil 6 is energized leftward in FIG. 11.

The position detecting outputs form the coils 17a and 17b are completely the same as to those in the case of FIG. 9 (a), so that the inputs of the respective upper input terminals, in the drawing, of the AND 53a and 53b take values shown by the curves 47a and 47b, and the curves 48a and 48b, as shown in the time chart of FIG. 10, as described above.

Since a high voltage is applied across power source terminals 31a and 31b, the rising portion of an armature current curve 50a becomes steep, and when the voltage drop of across a resistor 52 for the current detection becomes lower than a reference voltage (a voltage for instructing output torque), the output of a comparator 54 becomes "low" to thereby make both the outputs of the AND 53a and 53b "low". Accordingly, the transistor 44a is turned off. Thus, magnetic energy stored in the inductance of the armature coil is discharged so that the armature current decreases along a curve 49a. If the armature current becomes lower than the negative side hysteresis of the comparator 54, the output of the comparator 54 becomes "high" again to thereby turn the transistors 44a and 44b on, and the armature current increases again along a curve 49b. This cycle is repeated in accordance with the hysteresis characteristic of the comparator 54 which forms a positive feedback circuit.

Since the input of the AND 53a becomes "low" at the final portion of the curve 47a, both the transistors 44a and 44b are turned off, so that the armature current falls along a curve 49c. The falling point is required to be within the interval of 180 degrees in order to prevent reverse-torque from being mixed.

As described above, in this interval, the current flows through a diode 45c, the power source, and a diode 45d, and there is such a feature that the discharge disappears rapidly because of the high source voltage. This is because the magnetic energy is discharged when a current is made to flows back to the power source.

The armature current rises steeply at the curve 50a because of the high source voltage, then suppressed owing to the inductance of the armature coil, and thereafter steeply falls as seen at the curve 49c because of the high source voltage.

Accordingly, even if the armature coil has large inductance when the output torque is large, it is possible to make the curves 50a and 49c of the armature current exist within the interval of 180 degrees to thereby contribute to the increase in output torque and in efficiency.

Further, it is possible to make the revolutional speed high, if desired, owing to the characteristics described above.

Figure 11:
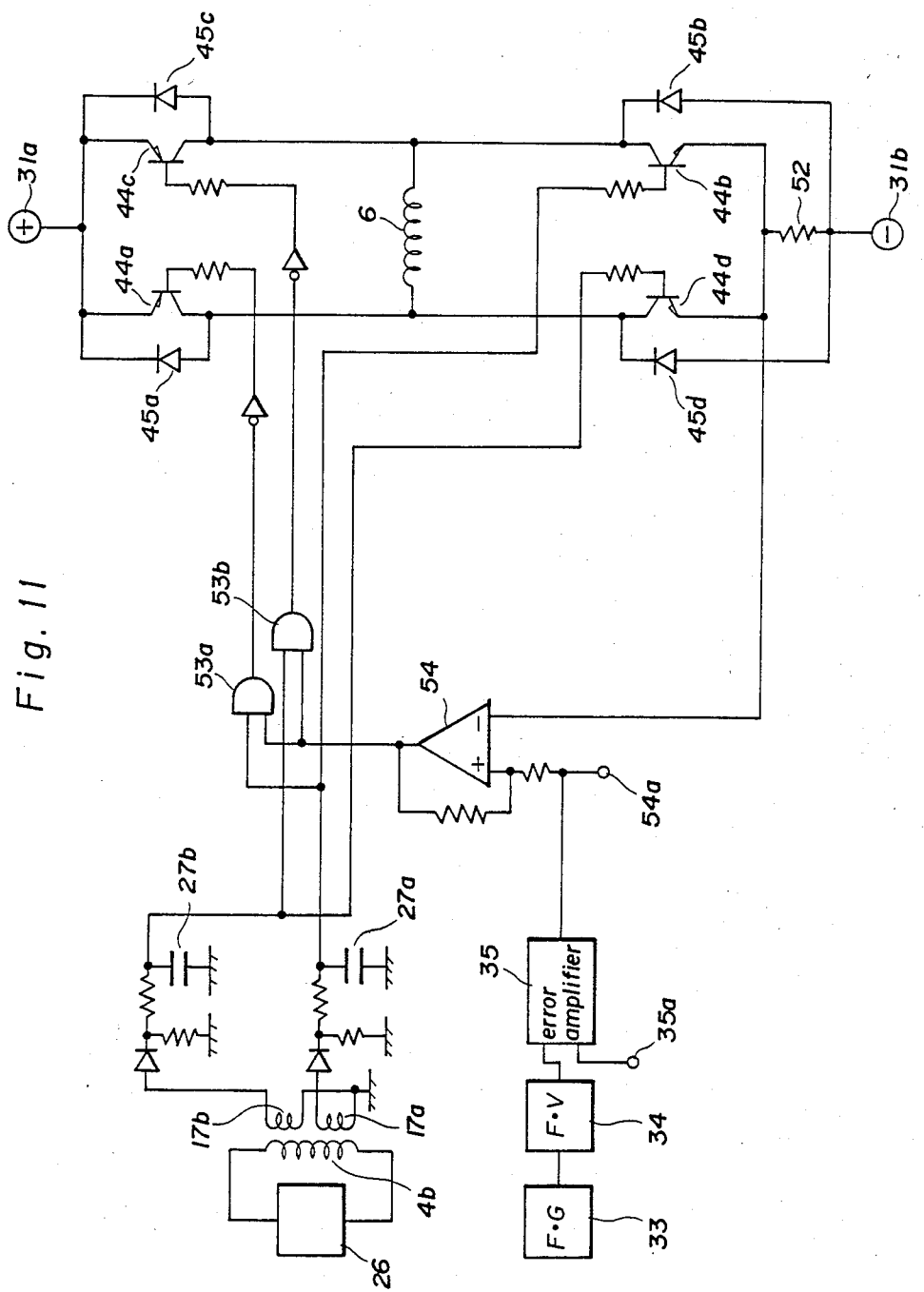
FIG. 11 is a diagram of the current conduction control circuit for the other phase of the armature shown in FIGS. 1(a) and 1(b)

Next, when the electric signal of the curve 48a is applied to the AND 53b, the output of the AND 53b becomes "high" so that ihe armature coil 6 is energized leftward in the drawing of FIG. 11 as described above. A curve 50b shows the armature current in this state. The curve 53b is steep at the negatively falling portion, and thereafter, the transistor 44c is repeatedly turned on/off owing to the operation of the comparator 54, the armature current comes to correspond to the input voltage applied to an input terminal 54a, and the current conduction is stopped at the final portion of the curve 48a. Thereafter, the armature current rapidly positively increases owing to the discharge of the magnetic energy stored in the armature coil 6. The reason why the armature current rapidly increase is completely similar to the case of the curve 50a.

Thus, the armature current takes a waveform composed of the curve 50a, 50b, 50c, . . . . .

It is preferable to prolong the width of a flat portion of the armature current as wide as possible. Accordingly, it is desirable to make the width of the curve 47a wider than 120 degrees. For this, it is desirable to reduce the width of the falling portion of the armature current at the curve 49c as narrow as possible, and this purpose can be achieved by making the applied voltage high. Since there is a limit practically, however, the width of the curve 49c is selected to be 30–60 degrees. There is a problem in self starting in the case of the single phase motor described above, and the width is selected to be about 30 degrees.

The features of this embodiment are as follows.

An input voltage signal instructing desired output torque is applied to the input terminal 54a so that the motor can be driven at a desired revolutional speed in accordance with the input signal, similarly to the embodiment 1. That is, there is a feature that the output torque can be varied independently of the applied voltage. The rising portion of the curve 50a in FIG. 10 is required to be steep corresponding to the revolutional speed and is adjustable by making the applied voltage across the terminals 31a and 31b high. Further, it is possible to make the falling portion of the curve 49c steep by making the applied voltage high. This is because the transistors 44a and 44b have been turned off simultaneously at the curve 49c as described above so that the stored magnetic energy is discharged from the coil 6 through the diode 45c→the power source→the diode 45d→the coil 6. Accordingly, if the source voltage is high, the power source is charged and therefore the discharge time can be adjusted by making the source voltage correspond to the revolutional speed.

On the other hand, at the curve 49a the stored energy is discharged from the coil 6 through the transistor 44b→the resistor 52→the diode 45d→the coil 6, so that the power source is never charged, and the discharge current does not decrease rapidly. Accordingly, there is such a feature that the on/off frequency of the transistor 44a becomes low so that the heat generation can be suppressed.

This applies to the case of current conduction through the transistors 44c and 44d in quite the same manner.

In place of the transistors 44a, 44b, 44c, l and 44d, any switching elements can be used so long as they have the same effect as that of those transistors.

Next, referring to FIG. 9(b), a modification of the asymmetric current conduction means for the armature coil 6 will be described.

Figure 9B:
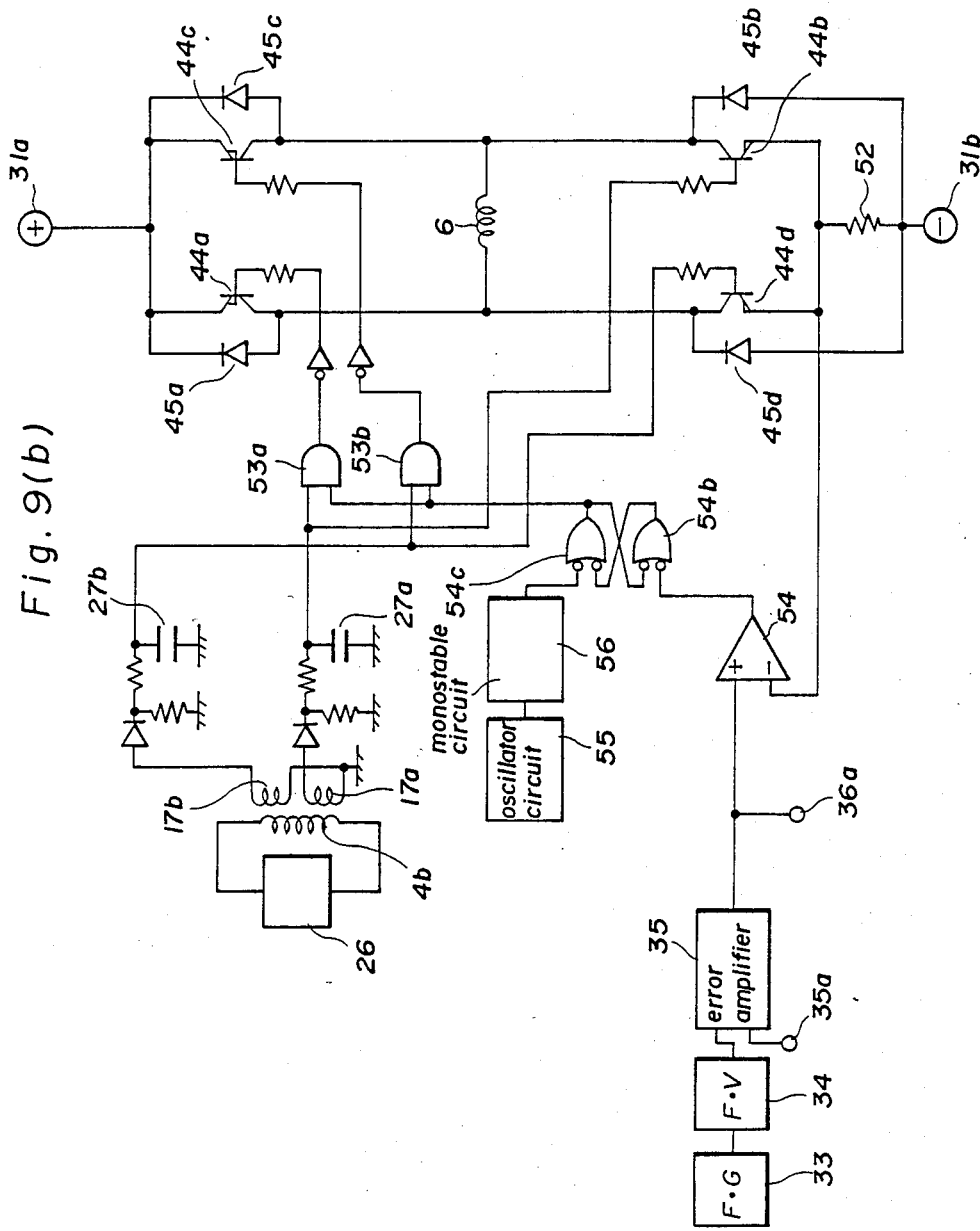

In FIG. 9(b), the parts designated by the same numerals as those in FIG. 11 are the same in operation and in effect.

In this example, transistors 44a, 44b, 44c, and 44d and an armature coil 6 constitute a well known transistor bridge circuit.

Referring to the time chart of FIG. 10, description will be made as to the case of asymmetrical current conduction. In FIG. 10, the uppermost diagram shows a development of protrusions 46a, 48b, . . . provided on the outer surface of the core 2b illustrated in each of FIGS. 1(a) and 4(a). The protrusions 46a, 46b, . . . are provided instead of the curved surface 18 and are opposed to coils 17a and 17b.

Each of the intervals from the starting point to a dotted-line 52a and from the dotted line 52a to a dotted line 52b selected to be 180 degrees. Accordingly, each width of ihe protrusions is selected to be 120 degrees. Each interval between two adjacent protrusions is therefore selected to be 240 degrees.

Description will be made by using the circuit in FIG. 9(b) in addition to FIG. 10.

Since the induced output is the largest when coils 17a and 17b are opposed to the protrusions 46a and 46b respectively, when a rotor 7, and hence the core 2b, rotates in the direction of the arrow B in FIG. 10, the input to an upper one (in the drawing) of the input terminals of an AND 53a successively takes the values as shown by curves 47a, 47b, . . . and the input to an upper one (in the drawing) of the input terminals of an AND 58b takes the values as shown by curves 48a, 48b, . . . .

When the output of the AND 53a is "high", the transistor 44a is turned on owing to its base input applied through an inverter and the transistor 44b is also turned on at the same time because a "high" input is applied to the base thereof. Accordingly, the armature coil 6 is energized rightward in FIG. 9(b).

When the output of the AND 58b is "high", the transistor 44c is turned on owing to its base input applied through another inverter and the transistor 44d is also turned on at the same time because a "high" input is applied to the base thereof. Accordingly, the armature coil 6 is energized leftward in FIG. 9(b).

Since a high voltage is applied across a pair of power source terminals 31a and 31b, an armature current curve 50a is steep at the rising portion so that an R-S flip-flop 54b and 54c is energized in response to the fact that the voltage drop across a resistor 52 for current detection is smaller or larger than a reference voltage (voltage instructing the output torque, that is, the input at a terminal 38a), so as to control the armature current. Next, the control will be described in detail with reference to a time chart of FIG. 12.

In FIG. 12, a curve 57 corresponds to the position detecting signal 47a in FIG. 10. The transistors 44a and 44b are turned owing to the input electric signal of the curve 57 applied through the AND 53a in FIG. 9(b).

The output of an oscillator circuit 55, and hence the output of a monostable circuit 56, is shown by reference numerals 62a, 62b, . . . in FIG. 12. The circuits 55 and 56 constitutes a pulse generator circuit. An electric pulse 62b energizes the R-S flip-flop 54b and 54c so as to make the lower input terminal, in the drawing, of the AND 53a "high", so that the armature current is increased as shown by a curve 64a in FIG. 12.

In FIG. 12, a dotted line 63 shows the level of the input voltage at the terminal 36a. Accordingly, when the armature current is increased to make the level of the voltage drop across the resistor 52 exceed that of the input at the terminal 36a, the output of a comparator 54 becomes "low", the R-S flip-flop 54b and 54c is inverted, the input at the lower terminal, in the drawing, of the AND 58a becomes "low", and the transistor 44a is turned off.

The magnetic energy stored in the armature coil 6 is discharged through the transistor 44b, the resistor 52, and a diode 45d. Thus, the stored magnetic energy flows from the armature coil 6 back to the same without passing through the power source, so that the falling curve 64b is gentle. When the electric pulse 62c appears again, the R-S flip-flop 54b and 54c is energized again and the output of the AND 53a becomes "high", so that the current flowing in the armature coil 6 is increased as seen at the curve 64c.

The cycle described above is repeated, and the upper limit of the current value is restricted at the dotted line 63, that is, the level of the input signal at the terminal 36a in FIG. 9(b).

Since the output of the AND 53a becomes "low" at a final portion of the voltage curve 57 in FIG. 12, that is, at the final period of the curve 47a in FIG. 10, the transistors 44a and 44b are turned off. Accordingly, the magnetic energy stored in the armature coil 6 flows from the coil 6 back to the same through a diode 45c, the terminal 31a, the power source, the terminal 31b, and the diode 45d. Since the flowing back is performed in the mode of charging the power source, the armature current is decreased rapidly as seen in the curve 64d in FIG. 12.

The current conduction curves 64a, 64b, . . . in FIG. 12 are shown by the curves 50a, 49a, . . . 49c in FIG. 10.

The armature current rises steeply at the curve 50a because of the high source voltage, then suppressed owing to the inductance of the armature coil, and thereafter rapidly falls as seen at the curve 49c because of the high source voltage.

Accordingly, even if the armature coil has large inductance when the output torque is large, it is possible to make the curves 50a and 49c of the armature current exist within the interval of 180 degrees to thereby contribute to the increase in output torque and in efficiency.

Further, it is possible to make the revolutional speed high, if desired, owing to the characteristics described above.

Next, when the electric signal of the curve 48a is applied to the AND 53b, the output of the AND 53b becomes "high" so that the transistors 44c and 44d are turned on to energize the armature coil 6 leftward in the drawing of FIG. 9(b). The curve 50b shows the armature current in this state. The curve 53b is steep at the negatively falling portion, and thereafter, the transistor 44c is repeatedly turned on/off owing to the operations of the R-S flip-flop 54b and 54c, the comparator 54, the oscillator circuit 55, and the monostable circuit 56, so that the armature current is made to correspond to the input voltage applied to the input terminal 54a, and the current conduction is stopped at the final portion of the curve 48a. Thereafter, the armature current rapidly positively increases owing to the discharge of the magnetic energy stored in the armature coil 6. The reason why the armature current rapidly increase is completely similar to the case of the curve 50a.

Thus, the armature current takes a waveform composed of the curve 50a, 50b, 50c, . . .

It is preferable to prolong the width of a flat portion of the armature current as wide as possible. Accordingly, it is desirable to make the width of the curve 47a wider than 120 degrees. For this, it is desirable to reduce the width of the falling portion of the armature current at the curve 49c as narrow as possible, and this purpose can be achieved by making the applied voltage high. Since there is a limit practically, however, the width of the curve 49c is selected to be 30-60 degrees. There is a problem in self starting in the case of the single phase motor described above, and the width is selected to be about 30 degrees.

The constant-speed control through an FG circuit 33, an FV circuit 43, and an error amplifier 35 can be performed in the same manner as described in the first embodiment.

The foregoing embodiments have been described as to a single-phase motor; however, a two-phase motor and a three-phase motor can be arranged according to the same technical thought of the invention as that in the foregoing embodiments.

Figure 1B:
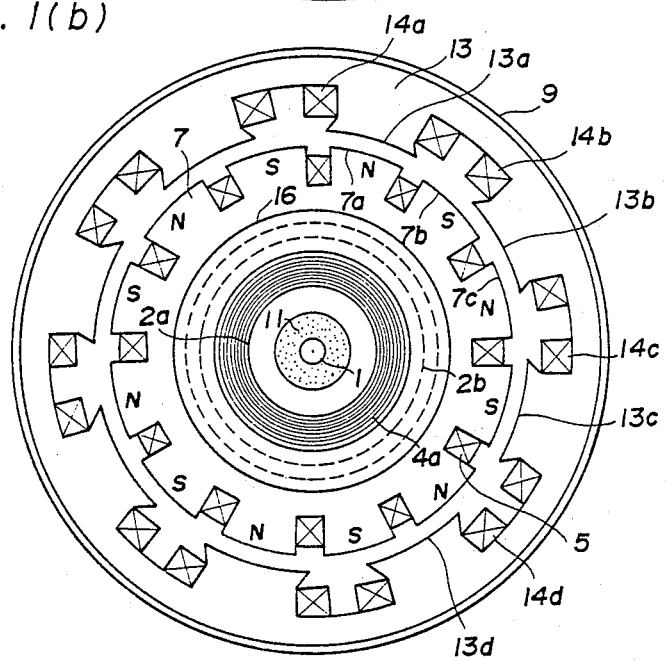
FIG. 1(b) is a front view showing an embodiment of the two-phase motor according to the present invention.

Since a two-phase motor and a three-phase motor are arranged quite similarly, description will be made as to a two-phase motor with reference to FIG. 1(b) together with FIG. 3(b) which is a development of FIG. 1(b).

A fixed armature 13 is fixed attached to an outer casing 9, and provided at its inner surface with salient poles 13a, 13b, . . . . The respective widths of the salient poles 13a, 13b, . . . are made equal to each other and to those of magnetic poles 7a, 7b, . . . .

Armature coils 14a, 14b, . . . are mounted on the salient poles 13a, 13b, . . . respectively. The salient poles 13a, 13b, . . . are eight in number and provided at regular pitches. As apparent from a development in FIG. 3(b), the salient poles 13a, 13c, 13e, and 13g face the magnetic poles 7a, 7d, 7g, and 7j respectively.

Each of the salient poles 13b, 13d, 13f, and 13h is delayed in phase by 90 degrees relative to the respective magnetic pole. Accordingly, when all the salient poles 13b, 13d, 13f, and 13h are excited to N-poles, a rotor 7 is driven to rotate in the direction of an arrow B in FIGS. 3(b). At that time, the salient poles 13a, 13c, 13e and 13g are excited to N-poles so as to cause the rotor to rotate continuously.

If the armature coils 14a, 14c, 14e, and 14g are connected in series of parallel to one another to constitute the armature coil 6a which is energized by such an electric circuit as shown in FIG. 7(a), FIG. 7(b), FIG. 9(a), FIG. 9(b), or FIG.11, the motor can be driven to rotate as a single-phase motor.

On the contrary, if the armature coils 14b, 14d, 14f, and 14h are energized by a current with a phase delayed by 90 degrees than the other coils, the motor can be driven to rotate as a two-phase motor.

The reason why the motor is driven as a two-phase is that the phase difference in output torque between the coil groups is 90 degrees.

As the electric circuit for energizing the armature coils 14b, 14d, 14f, and 14h, such a circuit as shown in FIG. 7(a), FIG. 7(b), FIG. 9(a), FIG. 9(b), or FIG. 11 can be used, however, the position of the coils for generating position detecting signals should be changed. Coils 17c and 17d are provided so as to face a curved surface 18 of an outer ring 16 shown in FIG. 3(a). Each of the coils 17c and 17d has a width of 180 degrees, and the coils 17a and 17c are separated from each other by 90 degrees.

In such a circuit as shown in FIG. 7(a), FIG. 7(b), FIG. 9(a), FIG. 9(b), or FIG. 11 in which the coils 17a and 17b are replaced by the coils 17c and 17d, an armature current out of phase by 90 degrees relative to the curve 41 shown in FIG. 8 is caused to flow in the armature coil 6 (composed of the armature coils 14b, 14d, 14f, and 14h in this case).

In the case where the coils 17a and 17b are used for the position detection, the armature coil 6 is constituted by the armature coils 14a, 14c, 14e, and 14g, so that the motor can be driven to rotate as a two-phase motor in this embodiment.

The operations and effects in this embodiment are the same as those in the embodiment of FIG. 1(a) except that self-starting can be performed and the output torque has little ripple.

Further, if the curve of the armature current of each phase is varied so that the respective values of the output torque of the two phases are made to be in proportion to a square of a sine curve and a cosine curve respectively, the composite torque has a fixed value so that it is possible to obtain output torque having no ripple.

Figure 3B:
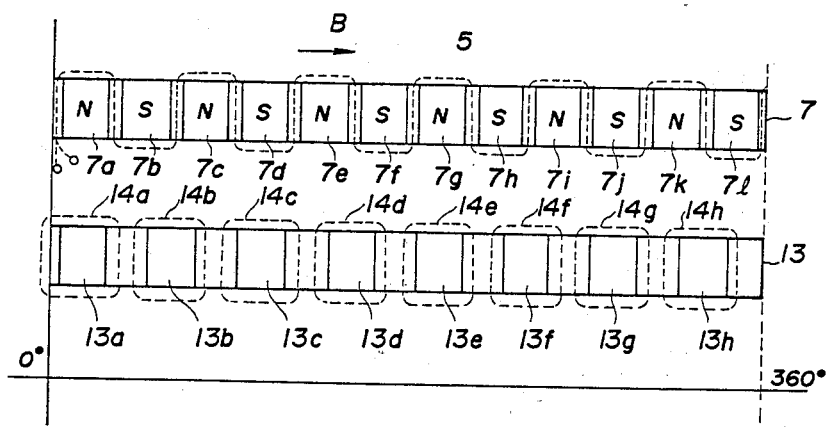
FIG. 3(b) is a development of the armature and rotor of FIG. 1(b)

Though the salient poles in FIG. 3(b) are specifically arranged, the objects of the present invention can be achieved even when a well known two-phase lap winding is provided. This applies to the case of a three-phase motor in quite the same manner.

In the case a two-phase moior is constituted by such a circuit as shown in FIG. 9(b) or FIG. 11, the armature current of one of the two phases is composed of the curves 50a, 50b, . . . shown in FIG. 10, while the armature current of the other phase is composed of the curves 51a, 51b, . . . .

The composite torque due to the current conduction by means of the armature currents composed of the curves 50a, 50b, . . . and composed of the curves 51a, 51b, . . . respectively, has no dead point so that it is possible to obtain output torque having a little ripple.

In FIGS. 3(b), the armature coils 14a, 14c, 14e, and 14g are energized by the armature current composed of the curves 50a, 50b, . . . while the armature coils 14b, 14d, 14f, and 14h are energized by the armature current composed of the curves 51a, 51b, . . . .

Figure 9C:
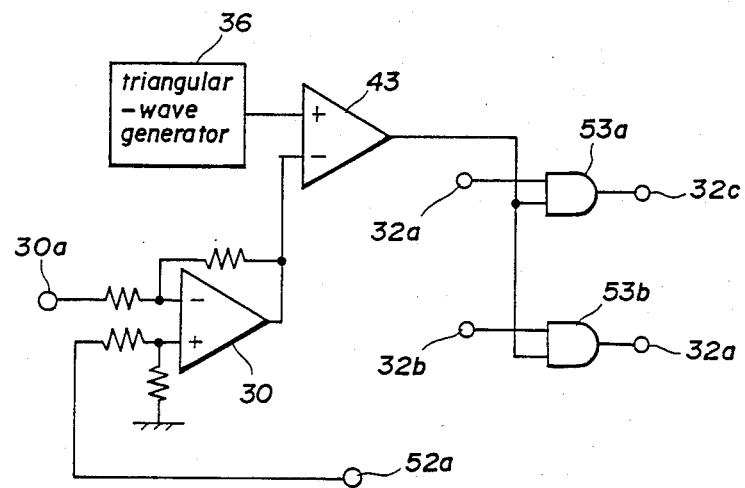
FIG. 9(c) is a diagram of the armature current control circuit.

The same object can be achieved even if a part of the circuit in FIG. 9(b) is changed as shown in FIG. 9(c). In the circuit of FIG. 9(c), the same parts as those in the circuit of FIG. 7(c) are correspondingly referred.

In FIG. 9(c), the outputs of capacitors 27a and 27b shown in the circuit of FIG. 9(b) are applied to terminals 32a and 32b respectively. The respective outputs from terminals 32c and 32d are applied to the transistors 44a and 44c in FIG. 9(b) through inverters.

The input to a terminal 52a is corresponded to the voltage drop across the resistor 52 in FIG. 9(b).

A reference voltage for instructing the output torque is applied through a terminal 30a.

The output of an operational amplifier 43 increases or decreases corresponding to the state where the value of the armature current, and hence the value of the input voltage to the terminal 52a, becomes higher or lower than the reference voltage, that is, the voltage at the terminal 30a. Therefore, the respective outputs of ANDs 53a and 53b are adjusted with respect to the length of the interval of the "high" or "low" state thereof so as to make the peak value of the armature current correspond to the input to the terminal 30a. Thus, the object of the present invention can be achieved.

[Embodiment 3]

Figure 14A:
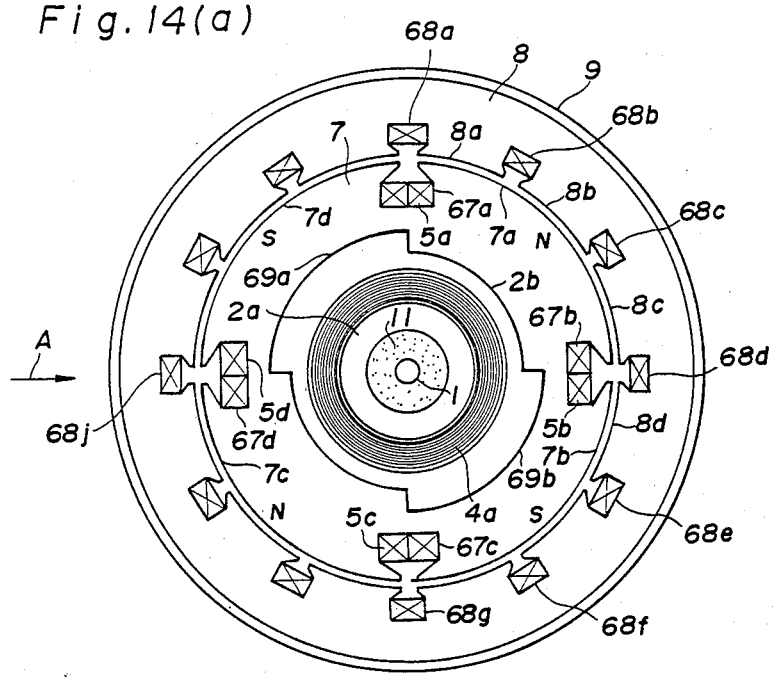
FIG. 14(a) is a front view of the embodiment of FIG. 13(a)

In FIG. 14(a), excitation coils are received in slots 67a, 67b, ... of a rotor 7 made by a stack of silicon steel plates, so that magnetic poles 7a, 7b, ... are excited by the excitation coils to N and S poles as shown in the drawing. Excitation coils 5a and 5b are received in the slots 67a and 67b and in the slots 67b and 67c respectively. Similarly to this, other excitation coils are received in other slots.

The magnetic poles 7a, 7b, ... are made to face salient poles 8a, 8b, ... through a slight gap therebetween.

Referring to FIGS. 15(a) through 15(d), a rotary transformer constituted by cores 2a, 2b, 3a, 3b, 4a, and 4b will be described.

Figure 15A:
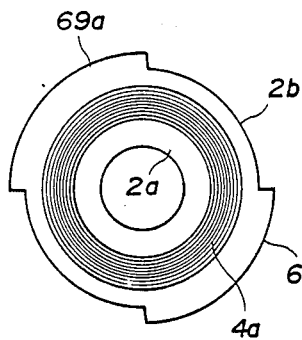
FIGS. 15(a) and 15(b) are views for explaining the rotary transformer and position detecting coils shown in FIG. 14(a)
Figure 15B:
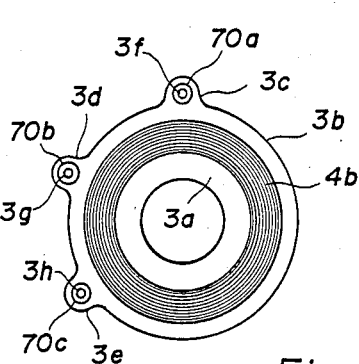

In FIG. 15(a), radially outwards projecting flange portions 69a and 69b are formed on the outer core 2b. In FIG. 15(b), radially outwards protrusions 3c, 3d, and 3e are formed on the outer core 3b, and columns 3f, 3g, and 3h are axially projected from the protrusions 3c, 3d, and 3e.

The column 3f is fitted in a central hole of a coil 70a of FIG. 16 (a). Similarly to this, the columns 3g and 3h are fitted in coils 70b and 70c respectively.

The columns 3f, 3g, and 3h (made of soft ferrite) are opposite to the outwards projecting flange portions 69a and 69b of FIG. 15(a).

Accordingly, when the cores 2a and 2b rotate together with the rotor 7, magnetic flux passing through the columns 3f, 3g, and 3h change to generate induced outputs in the coils 70a, 70b, and 70c. The induced outputs are used as position detecting outputs.

Figure 16A:
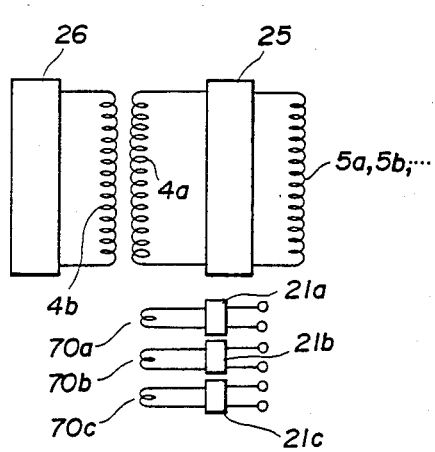
FIG. 16(a) is a diagram of the electric circuit of the rotary transformer and position detecting coils shown in FIGS. 15(a) and 15(b)

As shown in FIG. 16(a), an alternating current of about 50 KHz is caused to flow into a primary coil 4b from an oscillator circuit 26 constituted by transistors.

The output of a secondary coil 4a is rectified by a rectifier circuit 25 (which is fixed on the rotor 7) and applied to the excitation coils 5a, 5b, ... of in FIG. 14(a). The excitation coils 5a, 5b, ... are respectively received in the slots and alternately excite the magnetic poles to N and S poles.

As described above, the induced outputs are generated in the coils 70a, 70b, and 70c shown in FIGS.15(a) and 16(a) when the ouiwards projecting flange portions 69a and 69b of FIG. 15(a) are opposed to the columns 3f3g, and 3h. Those outputs are rectified and smoothed into DC outputs by rectifier-smoothing circuit 21a, 21b, and 2lc shown in FIG. 16(a) and produced through righthand terminals as the position detecting signals having a rectangular waveform, as shown in FIG. 16(a).

Figure 18A:
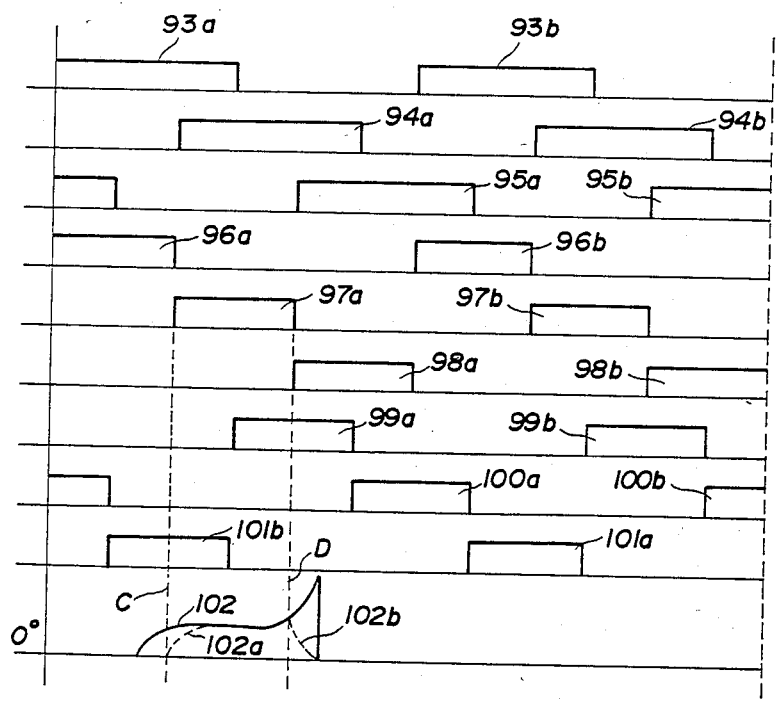
FIG. 18(a) is a time chart of the various outputs of the circuit of FIG. 17 and the armature current.

The above-mentioned position detecting signals are composed of curves 93a, 93b, ..., curves 94a, 94b, ... , and curves 95a, 95b, ... as shown in a time chart of FIG. 18(a).

In FIG. 15(a), the width of each of the outwards projecting flanges 69a and 69b is selected to be 90 degrees, and the outwards projecting flanges 69a and 69b are separated from each other at an interval of 90 degrees. The coils 70a, 70b, and 70c are equidistantly separated from each other by an interval of 60 degrees, so that the width of each of the curves 93a, 93b, ... is 180 degrees, and this applies to the curves 94a, 94b, ... and the curves 95a, 95b, ....

The phase difference among the curves 93a, 94a and 95a is 120 degrees.

Next, a development showing the rotor 7 of FIG. 14(a) and armature coils 72a, 72b, ... will be described.

In the FIG. 13 (a), the rotor 7 is provided with the four slots 67a, 67b, ... and the four magnetic poles 7a, 7b, ... respectively having widths equal to each other, and the excitation coils 5a, 5b, ... are received in the slots 67a, 67b, ... respectively.

In FIG. 14(a), a fixed armature 8 is provided with twelve slots 68a, 68b, ... and twelve salient poles 8a, 8b, ... respectively having widths equal to each other, and the armature coils are respectively received in the slots 68a, 68b, ....

Although the magnetic poles 7a, 7b, ... are provided four in number in this embodiment, the number is not limited to four, but may be six, eight, ten, ... or any other.

Figure 13A:
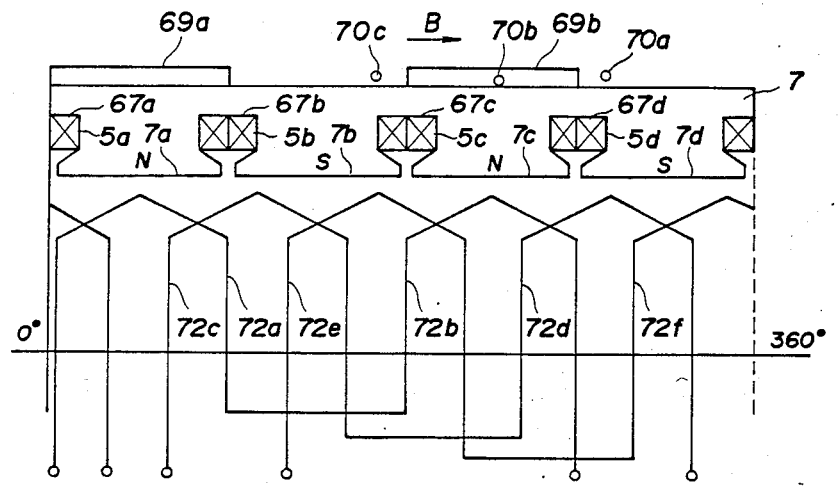
FIG. 13(a) is a development of the armature and rotor of another embodiment of the three-phase motor according to the present invention.

In FIG. 13(a), the above-mentioned armature coils are shown by the reference numerals 72a, 72b, ..., and 72f. Although each of the four pairs of armature coils 72a and 72b; 72c and 72d; 72c and 72d; and 72e and 72f are connected in series to each other, they may be connected in parallel to each other.

Although the embodiment illustrates an electric motor of the internal rotation type, the present invention can be realized in an electric motor of the external rotation type. In FIG. 13(a), the outwards projecting flanges 69a and 69b also shown in FIG. 15(a) each have a width of 180 degrees and are separated form each other by 180 degrees. The outwards projecting flanges 69a and 69b are rotated together with the rotor 7 in the direction of an arrow B. The coils 70a, 70b, and 70c opposed to the outwards projecting flanges 69a and 69b are equidistantly separated form each other by 120 degrees.

Although the embodiment shows a lap winding of three-phase armature coils, the armature may be arranged in the form of the well known salient-pole type.

Currents different in phase by 120 degrees are supplied to the four pairs of serially connected coils 72a and 72b, 72c and 72d, and 72e and 72f, respectively, to drive the rotor 7 in the direction of the arrow B. Referring to FIG. 19(b), a current conduction control circuit for each of the armature coils will be described hereunder in detail.

In FIG. 19(b), the reference numerals 31a and 31b designate a positive and a negative terminal of a DC power source.

A transistor bridge circuit is constituted by the serially connected armature coil 72a and 72b, and transistors 44a, 44b, 44c, and 44d, and diodes 45a, 45b, 45c, and 45d anti-parallelly connected to the transistors 44a, 44b, 44c, and 44d respectively.

A resistor 52 is provided for detecting the armature current, and the output voltage at a terminal 76 is in proportion to the armature current.

The transistors 44a and 44b may be replaced by any other switching elements so long as the latter can achieve the same purpose.

Figure 19B:
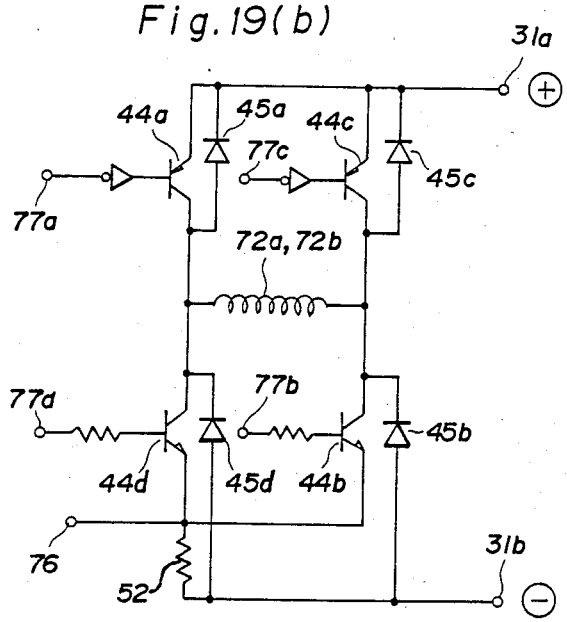
Figure 20A:
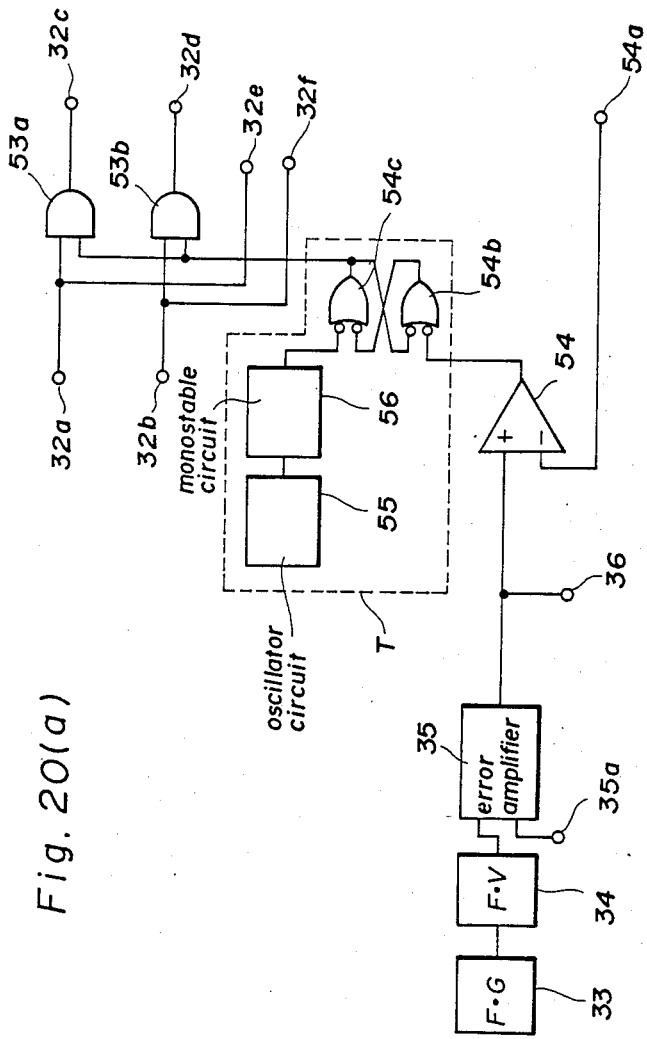

FIG. 20(a) shows a circuit for controlling the degree of the armature current. Description will be made now as to the case in which the circuit of FIG. 20(a) is used in combination with the circuit of FIG. 19(b).

The respective outputs from terminals 32c and 32d in FIG. 20(a) are applied to terminals 77a and 77c in FIG. 19(b) respectively, and the respective outputs from terminals 32e and 32f are applied to terminals 77b and 77d in FIG. 19(b) respectively. The respective inputs to terminals 32a and 32b are position detecting signals which will be described in detail with reference to FIG. 17.

Figure 17:
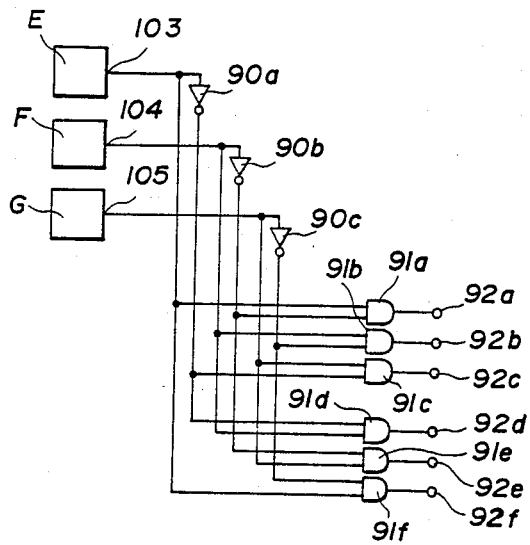
FIG. 17 is a diagram of the circuit for distributing three phase signals of the position detection output shown in FIG. 16(a)

In FIG. 17, each of circuits E, F, and G is constituted by the coil and the rectifier-smoothing circuit shown in FIG. 16(a). That is, circuit E is constituted by the coil 70a and the rectifier-smoothing circuit 21a, the circuit F is constituted by the coil 70b and the reciifier-smoothing circuit 21b, and G show the coil 70b and the circuit 21b, and the coil 70 and the circuit 21c respectively.

The outputs from terminals 103, 104, and 105 are applied to ANDs 91a, 91b, . . . , and 91f directly and through inverters 90a, 90b, and 90c.

The outputs from terminals 92a, 92b, . . . , and 92f are described in reference to a time chart of FIG. 18(a).

In FIG. 18(a), curves 93a, 93b, . . . , curves 94a, 94b, . . . , and curves 95a, 95b, . . . show the respective outputs from the terminals 103, 104, and 105 in FIG. 17; curves 96a, 96b, . . . , and curves 97a, 97b, ... show the respective outputs from the terminals 92a and 92b in FIG. 17; and curves 98a, 98b, . . . , curves 99a, 99b, . . . , curves 100a, 100b, . . . and curves 101a, 101b, . . . shows the respective outputs of the terminals 92c, 92d, 92e, and 92f in FIG. 17.

For example, if the current conduction of the armature coils 72c and 72d of FIG. 13(a) is effected over the whole width, that is, 180 degrees, of the magnetic poles 7a, 7b, . . . when the armature coils pass over the whole width, the armature current flows with a waveform shown by the curve 102 and the value of the armature current is quickly increased at the final period in the whole width because the magnetic flux is saturated and the counter electromotive force decreases. Accordingly, a disadvantage is that a copper loss which is useless for torque increases to deteriorate efficiency and to reduce the torque. In the case of a three-phase Y-connection motor, the armature current conduction interval is generally set to 120 degrees, and the armature current has a rising portion shown by a curve 102a and a falling portion shown by a curve 102b so that the above-mentioned disadvantage can be removed.

In the case of large torque and a high revolutional speed, however, the rising portion 102a becomes more gentle and the curve 102b extends further rightward in the drawing so that the efficiency is reduced and reverse-torque increases. Therefore, it is difficult to manufacture the high-torque and high-speed motor of this kind.

As apparent from the above description, the coil 70a for obtaining the curves 93a, 93b, . . . is fixed on the fixed armature at the right side of the armature coil 72b, that is, at a position displaced right by 30 degrees from the slot 68j (shown in FIG. 2). This applies to the other coils 70b and 70c in quite the same manner.

In FIG. 18(a), the curves 96a, 97a, and 98a each has a width of 120 degrees and are adjacent to each other. This applied to the curves 99a, 100a, and 101a. Each pair of the curves 96a and 99a, the curves 97a and 100a, and the curves 98a and 101a have a phase difference of 180 degrees therebetween.

The respective outputs from the terminals 92a and 92d in FIG. 17, that is, the curves 96a and 96b, . . . and the curves 99a and 99b, . . . are applied to the terminals 32a and 32b in FIG. 20(a) respectively. One of the curves 96a, 96b, . . . applied to the terminal 32a is shown as a curve 57 in FIG. 18(d).

Next, description will be made about the armature current conduction waveforms when the position detecting signal of the curve 57 is applied to the armature coils 72a and 72b.

The output from a terminal 76 in FIG. 19(b) is applied to a terminal 54a in FIG. 20(a).

The output of a pulse generator constituted by an oscillator circuit 55 and a monostable circuit 56 of FIG. 20(a) are as electrical pulses 62a, 62b, . . . in FIG. 18(d). The electric pulse 62b energized an R-S flip-flop 54c and 54b to make the input to the lower input terminal, in the drawing, of AND 53a "high", so that the armature current is increased as shown by a curve 64a in FIG. 18(d).

A dotted line shows a level of a voltage at a terminal 36. Accordingly, when the armature current is increased to make the voltage drop across a resistance 52 exceed the voltage at the terminal 36, the output of a comparator 54 ecomes "low", and the R-S flip-flop 54c and 54b is inverted, so that the input to the lower input terminal of the AND 53a becomes "low".

The respective outputs from the terminals 32c and 32e are applied to the terminal 77a and 77b in FIG. 19(b). Accordingly, when the respective outputs from the terminals 32c and 32e are "high", the transistors 44a and 44b are turned on so as to energize the armature coils 72a and 72b rightward in the drawing, while when the respective outputs from the terminals 32c and 32e are "low", the transistors 44a and 44b are turned off so as to deenergize the armature coils 72a and 72b. Similarly to this, when the respective inputs to the terminals 77c and 77d are "high", the transistors 44c and 44d are turned on so as to energize the armature coils 72a and 72b leftward in the drawing, while when they are made "low", the current conduction is made off.

Returning to FIG. 20(a), when the output of the R-S flip-flop 54c and 54b becomes "low" as described above, the output of the AND 53a becomes "low", so that the rightward current conduction of the armature coils 72a and 72b is made off. The transistor 44b is, however, being in its on-state. Accordingly, the magnetic energy stored in the armature coils 72a and 72b is discharged through the transistor 44b, the resistor 52, and the diode 45d. Because the discharge is carried out without passing through power source, the discharge current falls gradually along a curve 64b. When the electric pulse 62c appears, the R-S flip-flop 54c and 54b is energized to make the output of AND 53a "high", so that the armature current through the armature coils 72a and 72b is increased along a curve 64c.

Such a cycle is repeated so that the upper limit of the current value is defined by the dotted line 63, that is, the input signal to the terminal 38 in FIG. 20(a).

The outputs of the AND 53a and terminal 32e become "low" at the final end of the voltage curve 57 in FIG. 18(d), that is, at the final end of the curve 96a in FIG. 18(a), so that the transistors 44a and 44b are turned off. Accordingly, the magnetic energy stored in armature 72a and 72b is caused to flow from the coils 72a and 72b back the same through the diode 45c, the power source, and the diode 45d. The reflux charges the power source, so that the armature current is rapidly reduced as shown by a curve 64d in FIG. 18(d).

The armature current is increased steeply along the curve 64a because the source voltage is high, then suppressed owing to the inductance of the armature coils, and thereafter decreased rapidly along the curve 64d because of the high source voltage.

Accordingly, even in the case where large inductance of the armature exists when the output torque is large, the curves 64a, 64b, ..., and 64d of the armature current can be located within the interval of 180 degrees to thereby contribute to the improvement in output torque as well as efficiency.

When it is desired to make the revolutional speed higher, a higher revolutional speed can be attained by using a higher voltage owing to the above mentioned characteristic. Next, when the electric signal of the curve 99a in FIG. 18(a) is applied to the input terminal 32b of the AND 53b, the output of the AND 53b becomes "high" so that the transistors 44c and 44d are turned on and the armature coils 72a and 72b are energized leftward in the drawing and the armature current rises steeply. Thereafter the transistor 44c repeatedly alternates on and off states so as to make the armature current correspond to the input voltage to the terminal 36 by means of the operations of the R-S flip-flop 54c and 54b, the comparator 54, the oscillator circuit 55, and the monostable circuit 56. Then, the current conduction is made off at the final end of the curve 99a. Thereafter, the magnetic energy stored in the armature coils 72a and 72b is rapidly discharged and the armature current is rapidly reduced in quite the same manner as in the case concerning the curve 96a.

The effect is the same in that the output torque can be controlled by increasing/reducing the input voltage at the terminal 36 independently of the applied voltage.

In FIG. 20(a), an FG 33, an F/V converter 34, and an error amplifier 35 are provided for performing constant-speed control. The revolutional speed of the motor is converted into a frequency of electric pulses by the FG 33 and the frequency is further converted into a voltage signal by the FV converter 34. A reference voltage for instructing the constant speed is applied to the error amplifier 35 through a terminal 35a.

If the revolutional speed of the rotor increases, the output voltage of the error amplifier 35 is lowered, so that the output voltage of the comparator 54 is also reduced to reduce the output torque to thereby make the revolutional speed to be a value balanced with the load torque.

When the rotor revolutional speed decreases, on the contrary, the control is carried out reversely so as to maintain the constant speed.

As apparent from the above description, the armature current is controlled by using the inductance of the armature coils, so that the occurs no Joule loss.

In this embodiment, although the large output torque can be obtained because the rotary transformer of the excitation type is used for obtaining magnetic field for a field system, the magnetic energy stored in the armature becomes so large that high-speed revolution of the motor cannot be obtained.

Accordingly, it is unavoidable to provide such means as disclosed above according to the present invention for causing magnetic energy stored in armature coils to rapidly flow back to a power source owing to a high applied voltage.

Next, referring to FIG. 19(a), a modification of the current conduction means of armature coils 72a and 72b will be described.

Figure 19A:
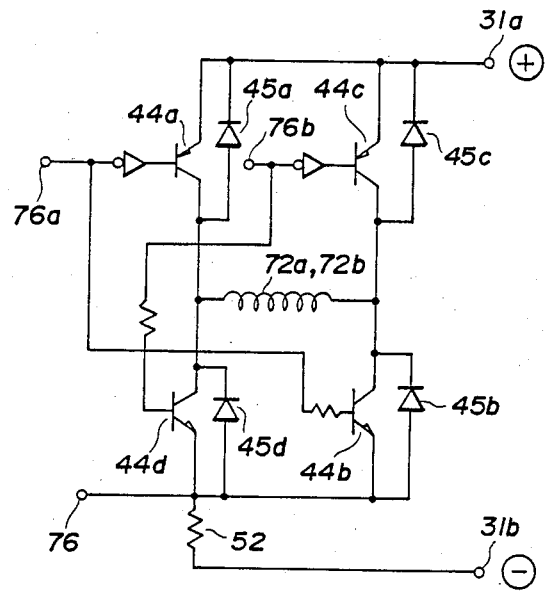
FIGS. 19(a) and 19(b) are diagrams of the current conduction control circuits for one phase of the armature coils shown in FIGS. 13(a) and 13(b) respectively.

In FIG. 19(a), the same parts as those in FIG. 19(b) are correspondingly referenced, and have the same operations Transistors 44a, 44b, 44c, and 44d together with the armature coils 72a and 72b constitute a well known transistor bridge circuit.

If the input to a terminal 76a is "high", the transistors 44a and 44b are turned on so that the armature coils 72a and 72b are energized rightward in the drawing, and if the input applied to a terminal 76b is "high", the transistors 44c and 44d are turned on so that the armature coils 72a and 76b are energized leftward in the drawing.

The case will be described hereunder in which the circuits of FIGS. 19(a) and FIG. 20(a) are used in combination with each other.

The respective outputs through terminals 32c and 32d in FIG. 20(a) are applied to the terminals 76a and 76b in FIG. 19(a) respectively. In this modification, the respective outputs at terminals 32e and 32f are not used. Similarly to the case of the previously discussed embodiment, the position detecting signals composed of curves 96a, 96b, ... and curves 99a, 99b, ... in FIG. 18 (a) are applied to terminal 32a and 32b in FIG. 20(a).

One of the curves 96a, 96b, ... is shown as a curve 57 in FIG. 18(d). An electric signal of the curve 57 is applied to the terminal 32a in FIG. 20(a). At that time, similarly to the former embodiment, the current of the armature coils 72a and 72b in FIG. 19(a) owing to the output from the terminal 32c is composed of the curves 64a, 64b, ..., 64d in FIG. 18(d), with the same operations and effects as that of the former embodiment.

This modification is, however, different in the following point. If the input to the terminal 76a in FIG. 19(a) becomes "low", the transistors 44a and 44b are turned off at the same time, so that the magnetic energy stored in the armature coils 72a and 72b is discharged through a diode 45c, a power source, and a diode 45d. Accordingly, the current is caused to flow back into the power source through power source terminals 31a and 31b, so that the stored magnetic energy is quickly extinguished to make large the angle of inclination of the curve 64b in FIG. 18(d). Therefore, the on/off frequency of the armature current becomes high. When the electric signal of the curves 99a and 99b in FIG. 18(a) is applied to the terminal 32b in FIG. 20(a), the control for the armature coils is carried out in quite the same manner as the former case so that that the current becomes as shown by the curves 64a, 64b, ... in FIG. 18(d). The operations and effects are the same as that of the former embodiment also in this case. Further, the gradient at the curve 64d becomes steep similarly to the former embodiment.

Figure 21:
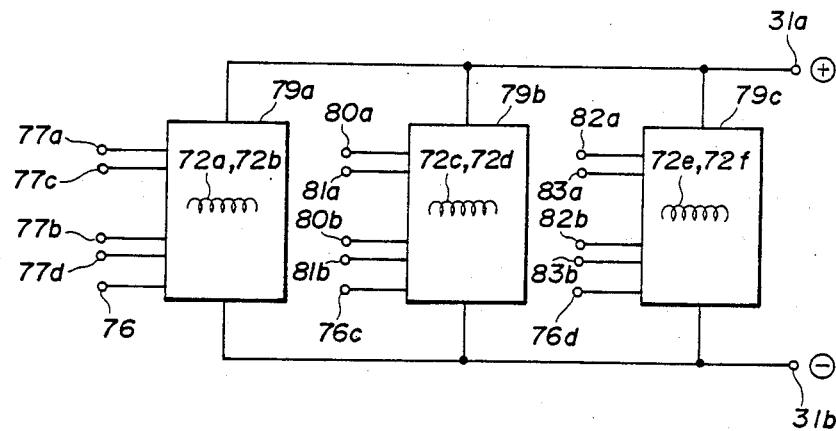
FIG. 21 is a block diagram of the current conduction control circuit for the three phases of the armature shown in FIG. 13(a) when three of the circuits shown in FIGS. 19(a) and 19(b) are used.

In FIG. 21, the reference numeral 79a represents a circuit constituted by a combination of the respective circuits shown in FIGS.19(b) and 20(a). The foregoing current conduction control for the armature coils 72a and 72b is carried out by the circuit 79a.

Next, the detail of the circuit of FIG. 21 will be described hereunder. In this circuit, terminals 77a, 77c, 77b, 77d, and 76 are the same as those designated by the same reference numerals in FIG. 19(b), and connected to the terminals 32c, 32e, 32e, 32f, and 54a in FIG. 20(a) respectively, thereby controlling the current conduction for the armature coils 72a 72b.

A circuit 79b in FIG. 21 is quite the same as the transistor bridge circuit shown in FIG. 19(b), in which the current conduction control for the armature coils 72c and 72d carried out. Terminal 80a, 81a, 80b, 81b, and 76c are respectively connected to terminals of a circuit having the same structure as that of FIG. 20(a) respectively corresponding to the terminal 32c, 32d, 32e, 32f and 54a in FIG. 20(a). The armature coils 72a 72b in FIG. 20(a) and FIG. 19(b) corresponding armature coils 72c and 72d in the circuit of 79b. The position detecting signals composed of the curves 97a, 97b, . . . , and the curves 100a, 100b, . . . in FIG. 18(a) are applied to the terminals 32a and 32b respectively. Accordingly, the control of the current conduction for the armature coils 72c and 72d is carried out in quite the same manner as that for the armature coils 72a ad 72b, with the same operations and effects as those of the latter.

A circuit 79c in FIG. 21 is quite the same as the transistor bridge circuit shown in FIG. 19(b), in which the current conduction control for the armature coils 72e and 72f is carried out. Terminals 82a, 83a, 82b, 83b, and 76d are respectively connected to terminals of a circuit having the same structure as that of FIG. 20(a) respectively corresponding to the terminal 32c, 32d, 32e, 32f, and 54a in FIG. 20(a). The armature coils 72a and 72b in FIG. 20(a) and FIG. 19(b) corresponding armature coils 72e and 72f in the circuit of 79c. The position detecting signals composed of the curves 98a, 98b, . . . , and the curves 101a, 101b, . . . in FIG. 18(a) are applied to the terminals 32a 32b respectively. Accordingly, the control of the current conduction for the armature coils 72e and 72f is carried out in quite the same manner as that for the armature coils 72a and 72b, with the same operations and effects as those of the latter.

The armatuer coils 72a, 72b, 72c, 72d, 72e, and 72f are those shown in FIG. 13(a) with the identical reference numerals, and the motor is actuated to drive the rotor 7 as a three-phase DC motor. In this case, there are the same effect as that described as to the armature coils 72a and 72b. In the circuit of FIG. 21, the circuit surrounded by a dotted line T, the input voltage to the terminals 36, the FG 33, the FV converter 34, and the error amplifier 35 can be commonly used.

Description will be made now as to the case in which the circuit of FIG. 20(b) is used in combination with the circuit of FIG. 19(b).

The terminals 77a, 77b, 77c, 77d, and 76 in FIG. 19(b) are connected to terminals 73c, 73e, 73d, 73f, and 54c in FIG. 20(b) respectively. The position detecting signals shown by the curves 96a 96b . . . , and the ourves 99a, 99b, . . . in FIG. 18(a) are applied to terminals 73a and 73b. An electric signal for instructing output torque is applied to a terminal 36a.

The operation of the circuit when the position detecting signal composed of the curves 96a, 96b, . . . is applied to the terminal 73a will be described in detail. One of the curves 96a, 96b, . . . of the position detecting signal is shown as the curve 57 in FIG. 18(d).

When the starting portion of the position detecting signal 57 is applied to the terminal 73a, if the output torque instructing signal applied to the terminal 36a is larger than the current detecting signal applied to the terminal 54c, the output of a comparator 54 becomes "high" so that the output of an AND 53a, that is, the output from the terminal 73c becomes "high". The respective outputs from the terminals 73e and 73c are applied to the terminals 77b and 77a in FIG. 19(b) respectively, so that the transistors 44a and 44b are turned on and the armature coils 72a and 72b are energized rightward in the drawing. The armature current at this time is shown as a curve 66a in FIG. 18(d).

Because the voltage applied across the power source terminals 31a and 31b is high, the rising portion of the armature current shown by the curve 66a is steep. If the voltage drop across the current detecting resistor 52 becomes larger than the input to the terminal 36a, that is, the reference voltage for instructing the output torque, the output of the comparator 54 is changed to "low" so as to make the respective outputs of the ANDs 53a and 53b "low". As a result, only the transistor 44a is turned off. The armature current is reduced along a curve 66b owing to the discharge of the magnetic energy stored in the armature coils. When the armature current is reduced to a predetermined value, the output of the comparator 54 becomes "high" again to thereby turn the transistor 44a on, so that the armature current along a curve 66c. Such a cycle is repeated owing to the hysteresis characteristic of the comparator 54 provided with a positive feedback circuit. The upper and lower limits of the armature current are shown by dotted lines 65a and 65b in FIG. 18(d). The difference in height between the dotted lines 65a and 65b is defined by the hysteresis characteristic of the comparator 54 and the respective heights of the dotted lines 65a and 65b are defined by the output torque instructing signal applied to the terminal 36a.

The respective outputs of the AND 53a and the terminal 73e become "low" at the final end portion of the curve 57 so as to turn the transistors 44a and 44b off to thereby lower the armature current along a curve 66d. It is necessary to locate the current falling point within the interval of 180 degrees so as to prevent reverse-torque from being mixed. Although the current conduction at this current falling portion is effected through the diode 45c, the power source, and the diode 45d as described above, there is a feature that the armature current is quickly extinguished because the power source voltage is high. That is because the energy is rapidly consumed to charge the power source.

The armature current is increased steeply along the curve 64a because the source voltage is high, then suppressed owing to the inductance of the armature coils 72a and 72b, and thereafter decreased rapidly along the curve 64d because of the high source voltage.

The position detecting signal 99a, 99b, . . . shown in FIG. 18(a) is applied to the terminal 73b of the AND 53b in FIG. 20(b), and the conduction of the transistors 44c and 44d in FIG. 19(b) are controlled by means of the respective outputs from the terminals 73d and 73e similarly to the transistors 44a and 44b, so that the armature coils 72a and 72b are energized leftward in the drawing.

The falling gradient of the armature current at the curve 66b in FIG. 18(d) is genile so as to make it possible to reduce the on/off frequency and torque ripple. The reason why the falling gradient becomes gentle is as follows. That is, the output of the AND 53a in FIG. 20(b) is applied to the terminal 77a in FIG. 19(b) and the position detecting signal composed of the curves 96a, 96b, . . . is applied to the terminal 77b independently of the output of the AND 53a. When the current conduction of the armature coils 72a and 72b is made off, the magnetic energy stored in the armature coils is caused to flow back through the transistor 44b, the resistor 52, and the diode 45d because the transistor 44b is maintained in its on-state even if the transistor 44a is turned off. Because the reflux is performed without passing through the power source, the gradient of the curve 66b becomes gentle.

This applies to the case of current conduction of the armature coils 72a and 72b through the transistors 44c and 44d in quite the same manner as above. At that time, a feature is that the current flows through the resistor 52 downward in the drawing so that the output voltage at the terminal 76 is reduced corresponding to the excitation current so as to make the output of the comparator 54 "high" when the output voltage of the comparator 54 reaches a setting value. It is impossible to use the circuit of FIG. 19(a) because the voltage drop across the resistor 52 is inverted when the transistors 44a and 44b are turned off if the circuit of FIG. 19(a) is used. Accordingly, the circuit of FIG. 19(a) can be used only in the case where the circuit of FIG. 19(a) is used in combination with the circuit of FIG. 20(a).

The speed control owing to an FG 33, an FV converter 34, and an error amplifier 35 can be effected in quite the same manner as that owing to those designated by the same reference numerals in FIG. 20(a). The input applied to a terminal 36a is a signal for instructing output torque similarly to that applied to the terminal 36 in FIG. 20(a). Even in the case where large inductance exists when the output torque is large, the curves of armature current come within the interval of 180 degrees to prevent reverse-torque from being mixed to thereby make it possible to obtain a high-speed and high-torque motor.

It is possible to carry out the current conduction control for the armature coils 72c and 72d for the second phase as well as the armature coils 72e and 72f for the third phase in quite the same manner as that for the armature coils 72a and 72b by using the circuits of FIG. 19(b) and FIG. 20(b), so that the rotor 7 can be driven to rotate as that of a three-phase DC motor. In this case, the position detecting signals 97a, 97b, . . . , and 100a, 100b, . . . in FIG. 18(a) are used for controlling the current conduction of the armature coils 72c and 72d for the second phase. The position detecting signals 98a, 98b, . . . , and 101a, 101b, . . . are used for controlling the current conduction of the armature coils 72e and 72f for the third phase.

Figure 13B:
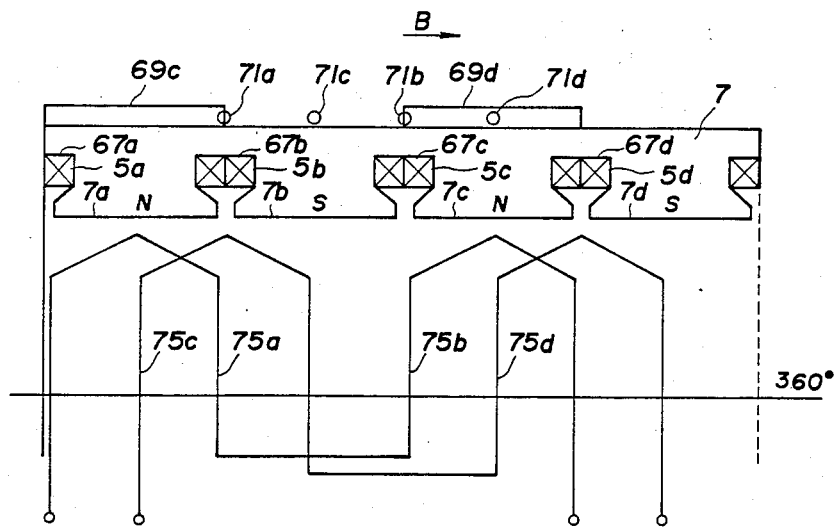
FIG. 13(b) is a development of the armature and rotor of a further embodiment of the two phase motor according to the present invention.

Referring to FIG. 13(b), the control for a two-phase motor will be described. Armature coils 75a and 75b are for the first phase, while armature coils 75c and 75d are for the second phase and located with a phase difference by 90 degrees from the armature coils 75a and 75b.

Figure 14B:
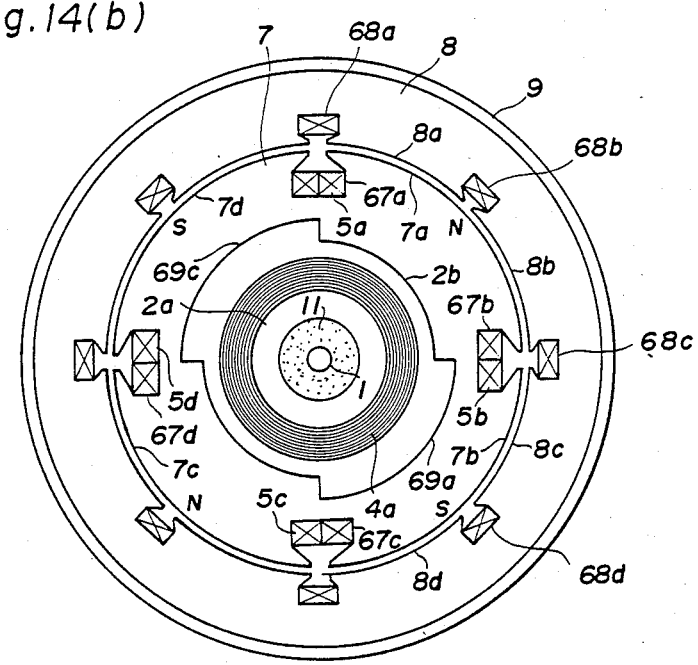
FIG. 14(b) is a front view of the embodiment of FIG. 13(b)
Figure 15C:
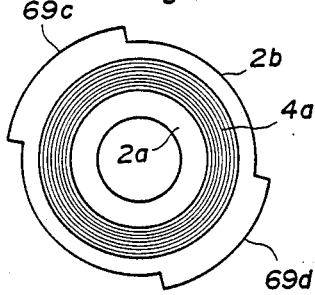
FIGS. 15(c) and 15(d) are views for explaining the rotary transformer and position detecting coils shown in FIG. 14(b)
Figure 15D:
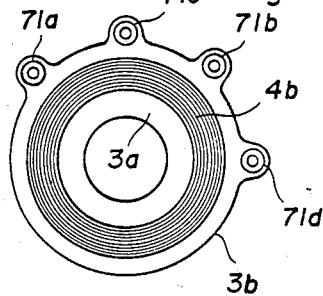

A rotary transformer shown in FIG. 14(b) is arranged such that an outer core 26 has a pair of outward projecting flanges 69c and 69d which are separated from each other by a width of 120 degrees and symmetrically disposed as shown in FIGS. 15(c) and 15(d).

Four protrusions are provided at a regular pitch of 90 degrees on an outer core 36 as shown in FIG. 15(d), and coils 71a, 71b, 71c, and 71d which act as position detecting elements are mounted on respective columns of the four protrusions as shown in the drawing. Induced outputs are obtained in the respective coils 71a 71b, 71c, and 71d whenever the columns come into opposition to the outward projecting flanges 69c and 69d.

Figure 16B:
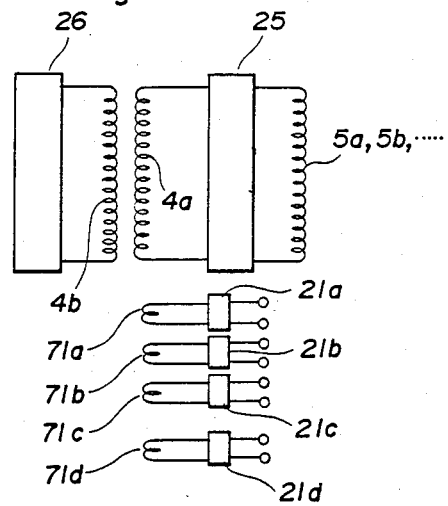
FIG. 16(b) is a diagram of the electric circuit of the rotary transformer and position detecting coils shown in FIGS. 15(c) and 15(d)
Figure 18B:
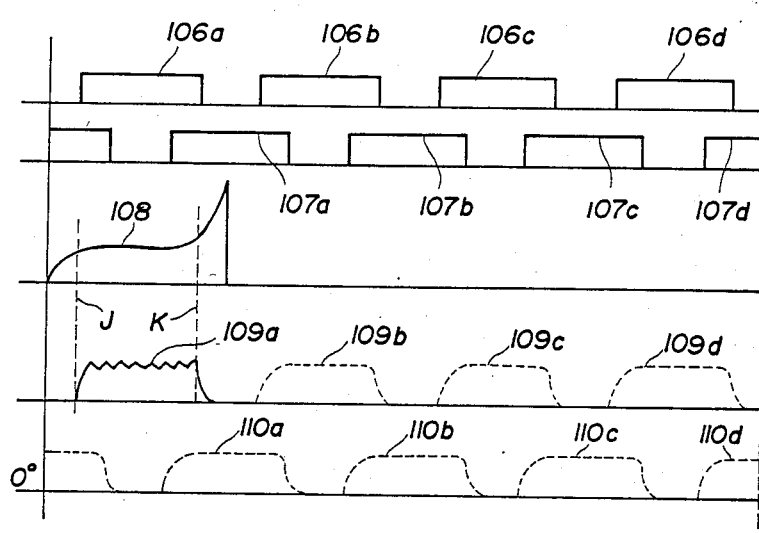
FIG. 18(b) is a time chart of the position detection signal and the armature current shown in FIG. 16(b)

As shown in FIG. 16(b), the induced output in the coils 71a, 71b, 71c, and 71d are rectified and smoothed by the respective rectifier-smoothing circuits 21a, 21b, 21c, and 21d, and then produced as rectangular position detecting signals. In FIG. 18(b), curves 106a, 106c, . . . show the position detecting signal produced from the rectifier-smoothing circuit 21a; curves 106b, 106d, . . . show the position detecting signal produced from the rectifier-smoothing circuit 21b; curves 107a, 107c, . . . show the position detecting signal produced from the rectifier-smoothing circuit 21c; and curves 107b, 107d, . . . show the position detecting signal produced from the rectifier-smoothing circuit 21d. The width of each of the curves 106a, 106b, . . . , and the curves 107a, 107b, . . . is 120 degrees. There are a phase difference of 180 degrees between the group of the curves 106a, 106c, . . . and the group of the curves 106b, 106d; a phase difference of 180 degrees between the group of the curves 107a, 107c, . . . and the group of the curves 107b, 107d, . . . ; and a phase difference of 90 degrees between the group of the curves 106a, 106b, . . . and the group of the curves 107a, 107b, . . . .

Now description will be made as to the case where the current conduction of the armature coils 75a and 75b is performed by using the circuits of FIGS. 19(b) and 20(a).

The armature coils 75a and 76b are substituted for the armature coils 72a and 72b in FIG. 19(b). The position detecting signal 106a, 106c, . . . , and the position detecting signal 106b, 106c, . . . are applied to the terminals 32a and 32b in FIG. 20(a) respectively.

In quite the same manner as the case discussed above, a current having a level corresponding a torque instructing reference voltage applied to the terminal 36 is caused to flow in the armature coils 75a and 75b (designated by 72a and 72b in the drawing) with a current conduction width of about 120 degrees such that the armature coils 75a and 75b (designated by 72a and 72b in the drawing) are energized rightward in the drawing by the current conduction shown by curves 109a, 109c, . . . in FIG. 18(b), while energized leftward in the drawing by the current conduction shown by curves 109b, 109d, . . . in FIG. 18(b).

The ripple in the curve 109a shows the ripple current shown by the curves 64b, 64c, . . . in FIG. 18(d).

The width of current conduction, that is the interval between dotted lines J and K, is about 120 degrees. This means that a general current conduction curve 108 is cut off at its opposite end portions so that there is an effect to improve the efficiency. The other curves 109b, 109c, . . . are illustrated with dotted lines with the ripple current omitted.

The current conduction of the armature coils 75c and 75d is performed also by using the circuits of FIGS. 19(b) and 20(a). That is, in FIG. 19 (b), the armature coils 72a and 72b are substituted by the armature coils 75c and 75d, and the curves 107a, 107c, . . . and the curves 107b, 107d, . . . shown in FIG. 18(b) are applied to the terminals 32a and 32b respectively. As a result, armature current curves 110a, 110c, . . . are obtained corresponding to the position detecting signal curves 107a, 107c, . . . so that the armature coils 75c and 75d (which are designated by the reference numerals 72a and 72b in the drawing) are energized rightward in the drawing, while, on the other hand, armature current curves 110b, 110d, . . . are obtained corresponding to the position detecting signal curves 107b, 107d, . . . so that the armature coils 75c and 75d (which are designated by the reference numerals 72a and 72b in the drawing) are energized leftward in the drawing.

Thus, the motor is driven in the mode of a two-phase motor with the same operations and effects as those in the three-phase motor discussed above.

Next, a time-chart of FIG. 18 (c) will be described.

Figure 23A:
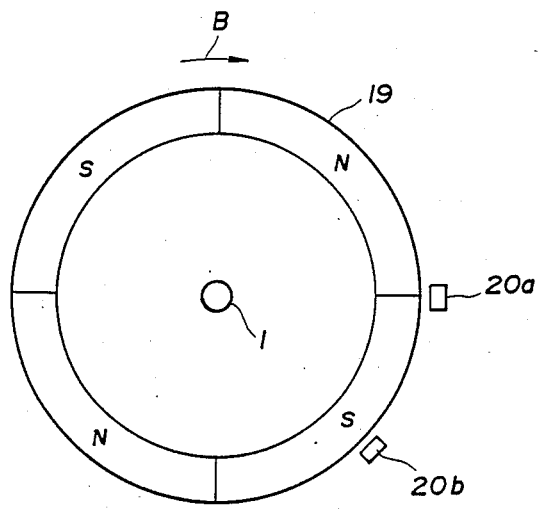
FIG. 23(a) is a view for explaining the case where a magnet and a Hall element are used as the position detector in the embodiments shown in FIGS. 13(a) and 13(b)

FIG. 23(a) shows an embodiment of the position detecting means in which a ferrite magnet 19 and Hall elements 20a and 20b are used. The magnet rotor 19 is magnetized to form four N and S magnetic poles at regular pitches and fixed at its central axis to a rotary shaft 1 so as to be in opposition to the Hall elements 20a and 20b. The Hall elements 20a and 20b are separated from each other by 90 degrees, and fixed to the armature, so as to obtain position detecting signals owing to the magnetic field due to the N and S magnetic poles.

Figure 23B:
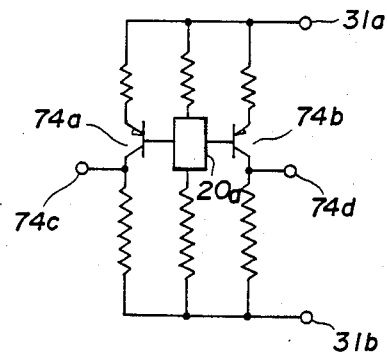
FIG. 23(b) is a diagram of an electric circuit including the Hall element shown in FIG. 23(a) and the periphery thereof.

FIG. 23(b) shows an electrical circuit including the Hall element 20a for the position detection. Whenever the Hall elements 20a comes alternately into the magnetic field due to an N pole and that due to an S pole, the output of the Hall element 20a is amplified alternately by transistors 74a and 74b respectively to thereby produce the position detecting signals through terminals 74c and 74d. The output position detecting signals produced when the Hall element 20a is opposed to the respective N-poles are shown by the curves 111a, 111c, . . . and the output position detecting signals produced when the Hall element 20a is opposed to the respective S-poles are shown by the curves 111b,111d, . . . in the time-chart in FIG. 18(c). The curves correspond to the magnetic fields.

Figure 18C:
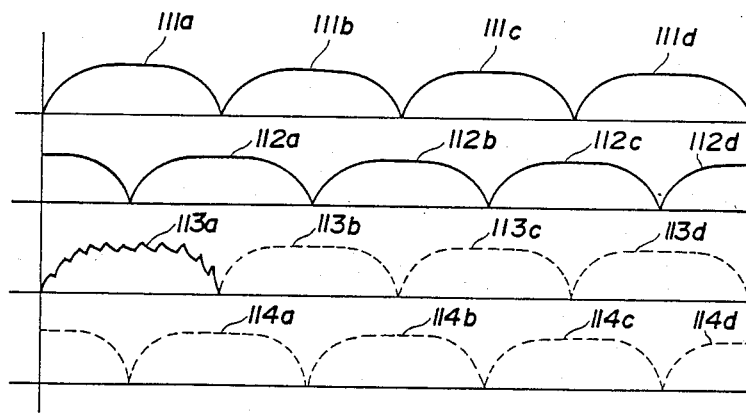
FIG. 18(c) is a time chart of the position detection signal and the armature current in the embodiment of FIG. 13(b)

The Hall element 20b is arranged in the same circuit as that shown in FIG. 23(b) so as to produce a Hall output, and whenever the Hall element 20b comes alternately into the magnetic field due to an S magnetic pole and that due to an N magnetic pole, the position detecting signal is produced alternatively as curves 112a, 112c, . . . and curves 112b, 112d, . . . as shown in FIG. 18(c).

The width of each of the curves 111a, 111b, . . . and the curves 112a, 112b, . . . is 180 degrees. There is a phase difference of 90 degrees between the position detecting signal of the curves 111a, 111b, . . . and the position detecting signal of the curves 112a, 112b, . . . .

Figure 22:
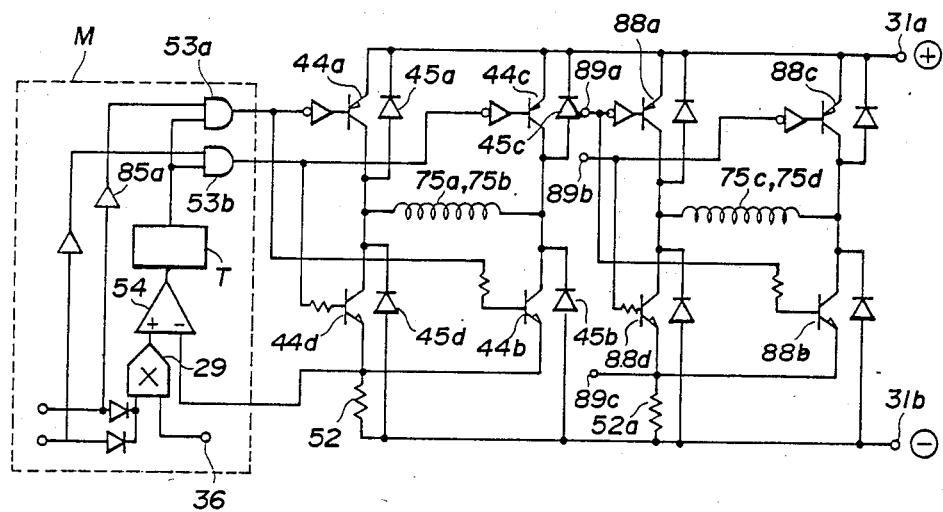
FIG. 22 is a block diagram of the current conduction control circuit for the two phases of the armature shown in FIG. 13(b) when two of the circuits shown in FIGS. 19(a) and 19(b) are used.

Referring to FIG. 22, description will be made as to the current conduction control circuit for armature coils 75a and 75b, and armature coils 75c and 75d.

A bridge circuit constituted by the armature coils 75a and 75b (corresponding to the armature coils 72a and 72b), transistors 44a–44d, and diodes 45a–45d is the same as that constituted by the parts correspondingly referenced in FIG. 19(b) and has the same operations and effects as the latter. Another bridge circuit constituted by the armature coils 75c and 75d, transistors 88a–88d, and four diodes also has the same operations and effects as that shown in FIG. 19(b). The position detecting signal shown by the curves 111a, 111c, . . . and the position detecting signal shown by the curves 111b, 111d, . . . , shown in FIG. 18(c), are alternatively applied to terminals 86a and 86b respectively. The inputs to the terminals 86a and 86b are alternatively applied to one input of a multiplier circuit 29, and at the same time are applied to comparators 85a and 85b so as to be shaped into rectangular waves which are in turn applied to respective one inputs of ANDs 53a and 53b.

A block T is a circuit the same as that designated by the same reference character in FIG. 20(a). The circuit T performs the control operation so as to make the respective lower inputs, in the drawing, of the ANDs 53 and 53b "low" when the output of the comparator 54 becomes "low", and so as to keep the respective lower inputs, in the drawing, of the ANDs 53a and 53b at "high" owing to the electrical signals 62a , 62b, . . . shown in FIG. 18(d). A different point is that the transistors 44a and 44b, and the transistors 44c and 44d are controlled at the same time by the outputs of the ANDs 53a and 53b respectively. A reference voltage for instructing output torque is applied through an terminal 36, so that a crest value of the input signal applied to the non-inverted input terminal of the comparator 54 is changed in accordance with the input reference voltage.

When a signal of a curve 43a in FIG. 18(c) is applied to the terminal 86a, the upper input, in the drawing, of the AND 53a is kept to be "high". An electrical signal 57a (which becomes an output of the multiplier circuit 29) shown by a dotted line in FIG. 18(d) is applied to the comparator 54 instead of the electrical signal 57 so as to be compared wiih the current detecting signal obtained by a resistor 52. Thus, the comparator 54 produces a output signal which is "high" or "low".

If the armature current is increased to exceed the curve 57a (that is, the output of the multiplier circuit), the output of the AND 53a becomes "low" to turn the transistors 44a and 44b off, thereafter the transistors 44a and 44b being turned on by the electrical signal 62b, 62c, shown in FIG. 18(d). The armature current is controlled by the repetition of such an operation as described above so as to have the same waveform which is substantially corresponding to the curve 57a without exceeding the latter. The waveform is shown as curves 113a, 113b, . . . in FIG. 18(c).

As apparent from the description made above, when the position detecting signal of the curves 111a, 111c, . . . is applied to the terminal 86a, the armaiure coils 75a and 75b are energized by a current which has a waveform as shown by the curves 113a, 113c, . . . and which flows rightward in the drawing, while when the position detecting signal of the curves 111b, 111d, . . . is applied to the terminal 86b, the armature coils 75a and 75b are energized by a current which has a waveform as shown by the curves 113b, 113d, . . . and which flows leftward in the drawing. Although the curves 113b, 113d, . . and curves 114a, 114b, . . . shown by dotted lines have saw tooth waveforms in the same manner as the curve 113a, they are shown by omitting the saw tooth portions.

In FIG. 22, although the input circuits for the respective terminals 80a, 89b, and 89c are omitted, the same circuit as that surrounded by a dotted line M is used for each of the terminals 89a–89c.

Accordingly, the output from the terminal 89c is applied to a non-inverted input terminal of another comparator corresponding to the comparator 54, and the respective inputs to the terminals 89a and 89b are the respective outputs of a further pair of ANDs corresponding to the AND 53a and 53b.

The electrical signals of the curves 112a, 112c, . . . and the curves 112b, 112d, . . . in FIG. 18(c) are applied to terminals corresponding to the terminals 86a and 86b respectively. Accordingly, the armature coils 72c and 72d are energized by a current which has waveforms shown by the curves 114a, 114c, . . . and which flows rightward in the drawing, and by a current which has waveforms shown by the curves 114b, 114d, . . . and which flows leftward in the drawing.

It is apparent that the motor is driven as a two-phase DC motor by performing the current conduction of the armature coils 75a and 75b, and 75c and 75d in the manner as described above.

It is possible to obtain a three-phase DC motor is such a manner that three Hall elements ar used similarly to FIGS. 23(a) and 23(b) so that three sets of position signals with a phase difference of 120 degrees there among are obtained by well known means to thereby control current conduction of armature coils for three phases by using the three sets of position signals.

In the case of the two- or three-phase motor, the reference voltage applied to the terminal 36 may be common to all the two or three phases. As will be apparent from the conduction current waveforms shown in FIG. 18(c), the armature current is suppressed to a small value at the first and last portions of the current conduction interval to thereby provide such an effect that the copper loss useless for output torque is reduced to improve efficiency.

If the magnet field distribution of the magnet rotor 19 in FIG. 23(a) is adjusted so that the position detecting signals 111a, 111b, ..., 112a, 112b, ... in FIG. 18(c) are sine or cosine curves when the magnet rotor 19 is magnetized, the output torque becomes a square curve of the sine curve. Becuase the sum of the two square curves of the respective sine curves having a phase difference of 90 degrees is constant, it is possible to obtain an electric motor having output torque with no torque ripple and it is possible to obtain means which is effectively used as a servo motor. It is possible to delete torque ripple by controlling the output torque by changing the waveforms of the position signals 111a, 111b, ..., 112a, 112b, ... in FIG. 18)c) through other well known means which is rotated together with the rotary shaft 1.

Thus, there is provided in accordance with the present invention a semiconductor motor which has the advantages discussed above. The embodiments described are intended to be merely exemplary and those skilled in the art will be able to make variations and modifications in them without departing from the spirit and scope of the invention. All such modifications and variations are contemplated as falling within the scope of the claims.

What is claimed is:

1. A m-phase semiconductor electric motor (m=1, 2, 3, ...) having field magnetic poles constituting a rotor, said motor comprising:

a rotor of magnetic material having 2n magnetic poles (n being a positive integer not smaller than 2), said magnetic poles consisting of N and S poles having equal widths and disposed alternately circumferentially;

a rotary shaft and a bearing for rotatably supporting said rotor;

an exciting coil for exciting said N and S magnetic poles;

a rotary transformer including a first and a second soft-ferrite core, said first and second cores having magnetic path open ends and being arranged to rotate relative to each other with said magnetic path open ends facing each other through a slight air gap therebetween, said first core being connected at its central hole with said rotary shaft of said rotor, said second core being fixed to an outer casing;

a primary and a secondary coil mounted on said second and first cores respectively;

a high frequency oscillator for supplying said primary coil with a high frequency current;

an electric circuit for rectifying the output of said secondary coil to thereby energize said exciting coil by said rectified output;

a fixed armature of magnetic material arranged to face said N and S magnetic poles of said rotor with an air gap therebetween, said fixed armature being provided with m phases of armature coils mounted thereon;

position detecting means for generating m phases rotor position detecting signals, said m phases rotor position detecting signals having the same waveforms, each of said waveforms having positive and negative portions alternating every 180 degrees electrical angle, each of said positive and negative portions having an early portion of 90 degrees in which an amplitude increases gradually from zero and a latter portion of 90 degrees in which the amplitude decreases gradually to zero;

means for providing a reference voltage for instructing output torque;

a multiplier circuit for multiplying said position detecting signal for every phase by said reference voltage;

an armature current detecting circuit for detecting an armature current in said armature coil for every phase;

an armature current control circuit for comparing a voltage corresponding to the armature current for every phase detected in said armature current detecting circuit with an output voltage of said multiplier circuit to thereby control the armature current in said armature coil for every phase such that a current path for said armature coil is cut off to cause magnetic energy stored in said armature coil to flow back to a DC source when said voltage corresponding to said armature current is, larger than said output voltage of said multiplier circuit, and current conduction of said armature coil is restored when said voltage corresponding to said armature current becomes smaller than said output voltage of said multiplier circuit by a predetermined value; and said DC source having an output voltage which is set corresponding to the output torque and revolutional speed of said motor so that the armature current has a value corresponding to said output voltage of said multiplier circuit.

2. A semiconductor electric motor according to claim 1, wherein said first rotary core is provided with an uneven portion at a part of its surface facing said second fixed core, and said second core is provided with an additional coil at its surface facing said uneven portion of said first core, so that magnetic flux generated from said primary coil of said second core and passed through said secondary coil of said first core causes said additional coil to generate induced electromotive force modulated by said uneven portion, said electromotive force being rectified to obtain said position detecting signals.

3. A semiconductor electric motor according to claim 1, wherein said first rotary core is provided with a magnet magnetized with 2n poles consisting of alternately disposed N and S poles, and said second fixed core is provided wiih a magnetic sensitive element in opposition to the magnetized surface of said magnet so that the output of said magnetic sensitive element is used as said position detecting signals.

4. A m-phase semiconductor electric motor (m=1, 2, 3, ...) having field magnetic poles constituting a rotor, said motor comprising:

a rotor of magnetic material having 2n magnetic poles (n being a positive integer not smaller than 2), said magnetic poles consisting of N and S poles having equal widths and disposed alternately circumferentially;

a rotary shaft and a bearing for rotatably supporting said rotor;

an exciting coil for exciting said magnetic poles;

a rotary transformer including a first and a second soft-ferrite core, said first and second cores having magnetic path open ends and being arranged to rotate relative to each other with said magnetic path open ends facing each other through a slight air gap therebetween, said first core being connected at its central hole with said rotary shaft of said rotor, said second core being fixed to an outer casing;

a primary and a secondary coil mounted on said second and first cores respectively;

a high frequency oscillator for supplying said primary coil with a high frequency current;

an electric circuit for rectifying the output of said secondary coil to thereby energize said exciting coil by said rectified output;

a fixed armature of magnetic material arranged to face said N and S magnetic poles of said rotor with an air gap therebetween, said fixed armature being provided with m phases armature coils mounted thereon;

position detecting means for generating m phases rotor position detecting signals, each having the same width rectangular waves, each of said m phases rectangular waves having wave portions of 180 degrees electrical angle, each of said wave portions having an early portion and a latter portion, said latter portion having a predetermined width not larger than 60 degrees and having an amplitude of zero;

means for providing a reference voltage for instructing output torque;

an armature current detecting circuit for detecting an armature current for every phase;

an armature current control circuit for comparing a voltage corresponding to the armature current for every phase detected in said armature current detecting circuit with said reference voltage to thereby control the armature current for every phase such that a current path for said armature coil is cut off to cause magnetic energy stored in said armature coil to flow back to a DC source when said voltage corresponding to said armature current is larger than said reference voltage, and current conduction of said armature coil is restored when said voltage corresponding to said armature current becomes smaller than said reference voltage by a predetermined value; and said DC source having an output voltage which is set so that the armature current has a crest value corresponding to said reference voltage and a width substantially equal to the width of each of said position detecting signals.

5. A semiconductor electric motor according to claim 4, wherein said first rotary core is provided with an uneven portion at a part of its surface facing said second fixed core, and said second core is provided with an additional coil at its surface thereof facing said uneven portion of said first core, so that magnetic flux generated from said primary coil of said second core and passed through said secondary coil of said first core causes said additional coil to generate induced electromotive force modulated by said uneven portion, said electromotive force being rectified to obtain said position detecting signals.

6. A semiconductor electric motor according to claim 4, wherein said first rotary core is provided with a magnet magnetized with 2n poles consisting of alternately disposed N and S poles, and said second fixed core is provided with a magnetic sensitive element in opposition to the magnetized surface of said magnet so that the output of said magnetic sensitive element is used as said position detecting signals.

7. A m-phase semiconductor electric motor (m=1, 2, 3, ...) having field magnetic poles constituting a rotor, said motor comprising:

a rotor of magnetic material having 2n magnetic poles (n being a positive integer not smaller than 2), said magnetic poles consisting of N and S poles having equal widths and disposed alternately circumferentially;

a rotary shaft and a bearing for rotatably supporting said rotor;

an exciting coil for exciting said N and S magnetic poles;

a rotary transformer including a first and a second ferrite core, said first and second cores having magnetic path open ends and being arranged to rotate relative to each other with said magnetic path open ends facing each other through a slight air gap therebetween, said first core being connected at its central hole with said rotary shaft of said rotor, said second core being fixed to an outer casing;

a primary and a secondary coil mounted on said second and first cores respectively;

a high frequency oscillator for supplying said primary coil with a high frequency current;

an electric circuit for rectifying the output of said secondary coil to thereby energize said exciting coil by said rectified output;

a fixed armature of magnetic material arranged to face said N and S magnetic poles of said rotor with an air gap therebetween, said fixed armature being provided with m phases armature coils mounted thereon;

position detecting means for generating m phases rotor position detecting signals, said m phases rotor position signals having the same waveforms, each of said waveforms having positive and negative portions alternating every 180 degrees electrical angle, each of said positive and negative portions having an early portion of 90 degrees in which an ampliiude increases gradually from zero and a latter portion of 90 degrees in which the amplitude decreases gradually to zero;

a transistor bridge circuit including transistors and diodes anti-parallelly connected for controlling current conduction of said armature coil responsive to said position detecting signals;

an armature current detecting circuit for detecting an armature current in said armature coil for every phase;

means for providing a reference voltage for instructing output torque;

a multiplier circuit for multiplying said position detecting signal for every phase by said reference voltage;

an armature current control circuit for comparing a voltage corresponding to the armature current for every phase detected in said armature current detecting circuit with an output voltage of said multiplier circuit corresponding to said armature current for every phase detected in said armature current detecting circuit so as to control said armature current in said armature coil for every phase such that a current path for said armature coil is cut off to cause magnetic energy stored in said armature coil to flow back to a DC source through said diodes when said voltage corresponding to said armature current is larger than said output voltage of said multiplier circuit, while current conduction of said armature coil is restored when said voltage corresponding to said armature current becomes smaller than said output voltage of said multiplier circuit by a predetermined value; and said DC source having an output voltage which is set corresponding to output torque and revolutional speed of said motor so that the armature current has a value corresponding to said output voltage of said multiplier circuit and the current conduction interval of said armature current has a width not larger than 180 degrees, electrical angle.

8. A semiconductor electric motor according to claim 7, wherein said first rotary core is provided with an uneven portion at a part of its surface facing said second fixed core and said second core is provided with an additional coil at its surface facing said uneven portion of said first core so that magnetic flux generated from said primary coil of said second core and passed through said secondary coil of said first core causes said additional coil to generate induced electromotive force modulated by said uneven portion, said electromotive force being rectified to obtain said position detecting signals.

9. A semiconductor electric motor according to claim 7, wherein said first rotary core is provided with a magnet magnetized with 2n poles consisting of alternately disposed N and S poles, and said second fixed core is provided with a magnetic sensitive element in opposition to the magnetized surface of said magnet so that the output of said magnetic sensitive element is used as said position detecting signals.

10. A m-phase semiconductor electric motor (m=1, 2, 3, ...) having field magnetic poles constituting a rotor, said motor comprising:

a rotor of magnetic material having 2n magnetic poles (n being a positive integer not smaller than 2), said magnetic poles consisting of N and S poles having equal widths and disposed alternately circumferentially;

a rotary shaft and a bearing for rotatably supporting said rotor;

an exciting coil for exciting said magnetic poles;

a rotary transformer including by a first and a second ferrite core, said first and second cores having magnetic path open ends and being arranged to rotate relative to each other with said magnetic path open ends facing each other through a slight air gap therebetween, said first core being connected at its central hole with said rotary shaft of said rotor, said second core being fixed to an outer casing;

a primary and a secondary coil mounted on said second and first cores respectively;

a high frequency oscillator for supplying said primary coil with a high frequency current;

an electric circuit for rectifying the output of said secondary coil to thereby energize said exciting coil by said rectified output;

a fixed armature of magnetic material arranged to face said N and S magnetic poles of said rotor with an air gap therebetween, said fixed armature being provided with m phases armature coils mounted thereon;

position detecting means for generating m phases rotor position detecting signals having the same width rectangular waves, each of said m phases rectangular waves having wave portions of 180 degrees electrical angle, each of said wave portions having an early portion and a latter portion, said latter portion having a predetermined width not larger than 60 degrees and having an amplitude of zero;

a transistor bridge circuit including transistors and diodes anti-parallelly connected for controlling the current conduction of said armature coil responsive to said position detecting signals;

an armature current detecting circuit for detecting an armature current in said armature coil for every phase;

means for providing a reference voltage for commanding output torque;

a multiplier circuit for multiplying said position detecting signal for every phase by said reference voltage;

a current conduction control circuit arranged to operate such that when said position detecting means has detected a position, said current conduction control circuit compares a voltage corresponding to the armature current for every phase detected in said armature current detecting circuit with said reference voltage so as to control said armature current in said armature coil for every phase such that a current path for said armature coil is cut off at one portion of the path to cause magnetic energy stored in said armature coil to flow back to said armature through said diode and cut off at a plurality of portions of said path to cause the stored magnetic energy to flow back to a DC source through said diode when said voltage corresponding to said armature current is larger than said reference voltage, while current conduction of said armature coil is restored when said voltage corresponding to said armature current is smaller than said reference voltage by a predetermined value, and that when said position detecting means detects no position, said current conduction control circuit compares said voltage corresponding to the armature current for every phase detected in said armature current detecting circuit with said reference voltage so as to control said armature current in said armature coil for every phase such that said current path for said armature coil is cut off at a plurality of portions of the path to cause the magnetic energy stored in the armature coil to flow back to said DC source through said diodes when said voltage corresponding to said armature current is larger than said reference voltage, and current conduction of said armature coil is restored when said voltage corresponding to said armature current is smaller than said reference voltage by said predetermined value; and said DC source having an output voltage which is set corresponding to output torque and revolutional speed of said motor so that the armature current has a value proportional to said reference voltage and the current conduction interval is set to provide said armature current.

11. A semiconductor electric motor according to claim 10, wherein said first rotary core is provided with an uneven portion at a part of its surface facing said second fixed core and said second core is provided with an additional coil at its surface facing said uneven portion of said first core so that magnetic flux generated from said primary coil of said second core and passed through said secondary coil of said first core causes said additional coil to generate induced electromotive force modulated by said uneven portion, said electromotive force being rectified to obtain said position detecting signals.

12. A semiconductor electric motor according to claim 10, wherein said first rotary core is provided with a magnet magnetized with 2n poles consisting of alternately disposed N and S poles, and said second fixed core is provided with a magnetic sensitive element in opposition to the magnetized surface of said magnet so that the output of said magnetic sensitive element is used as said position detecting signals.

13. A m-phase semiconductor electric motor (m=2, 3, ...) having field magnetic poles constituting a rotor, said motor comprising:

a rotor of magnetic material having 2n magnetic poles (n being a positive integer not smaller than 1), said magnetic poles consisting of N and S poles having equal widths and disposed alternately circumferentially;

a rotary shaft and a bearing for rotatably supporting said rotor;

an exciting coil for exciting said N and S magnetic poles;

a rotary transformer including a first and a second soft-ferrite core, said first and second cores having magnetic path open ends and being arranged to rotate relative to each other with said magnetic path open ends facing each other through a slight air gap therebetween, said first core being connected at its central hole with said rotary shaft of said rotor, said second core being fixed to an outer casing;

a primary and a secondary coil mounted on said second and first cores respectively;

a high frequency oscillator for supplying said primary coil with a high frequency current;

an electric circuit for rectifying the output of said secondary coil to thereby energize said exciting coil by said rectified output;

a fixed armature of magnetic material arranged to face said N and S magnetic poles of said rotor with an air gap therebetween, between, said fixed armature being provided with m phases armature coils mounted thereon;

position detecting means for generating m sets position signals for the m phases of said motor, each of said m sets position signals consisting of a first and a second position detecting signal, said first position detecting signal having a waveform repeated every 360 degrees electrical angle, said waveform having a first portion of 90 degrees in which an amplitude of said signal gradually increases from zero, a second portion of 90 degrees which follows said first portion and in which the signal amplitude gradually decreases to zero, and a third portion 180 degrees which follows said second portion and in which the signal amplitude is maintained zero, said second position detecting signal having a phase difference of 180 degrees relative to said first positon detecting signal and having a first, a second and a third portion which are similar to those of said first position detecting signal except that in said third portion of said second position detecting signal the signal amplitude is not zero;

m sets of transistor bridge circuits for controlling current conduction of said armature coils for said m phases by using said first and second position detecting signals of said m sets position detecting signals, each of said transistor bridge circuits including transistors and diodes anti-parallelly connected;

means for providing a reference voltage for instructing output torque;

a multiplier circuit for multiplying each of said m sets position detecting signals by said reference voltage;

an armature current control circuit for comparing an output of a circuitr detecting the armature current in said armature coil for every phase, with an output of said multiplier circuit, so as to control said armature current in said armature coil for every phase such that a current path for said armature coil is cut off to cause magnetic energy stored in said armature coil to flow back to a DC source through said diodes, when said first-mentioned output is larger than said second-mentioned output, and current conduction of said armature coil is restored when said first-mentioned output becomes smaller than said second-mentioned output; and said DC source having an output voltage which is set corresponding to output torque and revolutional speed of said motor so that the armature current has a value corresponding to said output of said multiplier circuit and the current conduction interval of said armature current has a width of 180 degrees electrical angle.

14. A semiconductor electric motor according to claim 13, wherein said first rotary core is provided with an uneven portion at a part of its surface facing said second fixed core and said second core is provided wiih an additional coil at its surface facing said uneven portion of said first core so that magnetic flux generated from said primary coil of said second core and passed through said secondary coil of said first core causes said additional coil to generate induced electromotive force modulated by said uneven portion, said electromotive force being rectified to obtain said position signals.

15. A semiconductor electric motor according to claim 13, wherein said first rotary core is provided wiih a magnet magnetized with 2n poles consisting of alternately disposed N and S poles, and said second fixed core is provided with a magnetic sensitive element in opposition to the magnetized surface of said magnet so that the output of said magnetic sensitive element is used as said position signals.

16. A three-phase semiconductor electric motor having field magnetic poles constituting a rotor, said motor comprising:

a rotor of magnetic material having 2n magnetic poles (n being a positive integer not smaller than 1), said magnetic poles consisting of N and S poles having equal widths and disposed alternately circumferentialy;

a rotary shaft and a bearing for rotatably supporting said rotor;

an exciting coil for exciting said N and S magnetic poles;

a rotary transformer including a first and a second soft-ferrite core, said first and second cores having magnetic path open ends and being arranged to rotate relative to each other with said magnetic path open ends facing each other through a slight air gap therebetween, said first core being connected at its central hole with said rotary shaft of said rotor, said second core being fixed to an outer casing;

a primary and a secondary coil mounted on said second and first cores respectively;

a high frequency oscillator for supplying said primary coil with a high frequency current;

an electric circuit for rectifying the output of said secondary coil to thereby energize said exciting coil by said rectified output;

a fixed armature of magnetic material arranged to face said N and S magnetic poles of said rotor with an air gap therebetween, said fixed armature being provided with three-phase armature coils mounted thereon;

a first, a second and a third position detecting element for detecting the revolutional position of said rotor to thereby obtain a first, a second and a third position detecting signal respectively, said first position detecting signal having a wave-form repeated every 360 degrees electrical angle in which said first position detecting signal appears at a preceding portion of 180 degrees and disappears at a succeeding portion of 180 degrees which follows said first portion, said second and said third position detecting signals having phase differences of 120 and 240 degrees respectively relative to said first position detecting signal;

a logic circuit for producing a fourth, a fifth, a sixth, a seventh, an eighth, and a ninth position detecting signal each having a rectangular waveform of 120 degrees electrical angles, the respective waveforms of said fourth, fifth and sixth position detecting signals being obtained from the respective preceding portion of 180 degrees of said first, second and third position detecting signals by deleting a portion of the last 60 degrees of the waveform of said first position detecting signal where the respective waveforms of said first and second position detecting signals are superimposed on each other, a portion of the last 60 degrees of the waveform of said second position detecting signal where the respective waveforms of said second and third position detecting signals are superimposed on each other, and a portion of the last 60 degrees of the waveform of said third position detecting signal where the respective waveforms of said third and first position detecting signals are superimposed on each other, the respective waveforms of said seventh, eighth and ninth position detecting signals being obtained from the respective preceding portion of 180 degrees of said first, second and third position detecting signals by deleting a portion of the first 60 degrees of the waveform of said first position detecting signal where the respective waveforms of said first and third position detecting signals are superimposed on each other, a portion of the first 60 degrees of the waveform of said second position detecting signal where the respective waveforms of said second and first position detecting signals are superimposed on each other, and a portion of the first 60 degrees of the waveform of said third position detecting signal where the respective waveforms of said third and second position detecting signals are superimposed on each other;

a first, a second, and a third transistor bridge circuit for respectively correspondingly controlling current conduction of said three phase armature coils by using said position detecting signals, each of said first, second and third transistor bridge circuits including transistors and diodes anti-parallelly connected;

a first current conduction control circuit for energizing the transistors of said first transistor bridge circuit on the basis of said fourth and seventh position detecting signals so as to perform current conduction of the first-phase armature coil alternating in direction, said current conduction being effected over a width of 120 degrees substantially at a central portion of an output torque curve over a width of 180 degrees;

a second current conduction control circuit for comparing the output of an armature current detecting circuit with a reference voltage for commanding output torque so as to control said armature current in said armature coil for every phase such that a current path for said armature coil is cut off at one portion of the current path to cause magnetic energy stored in said armature coil to flow back to said armature through said diode, and cut off at a plurality of portions of said path to cause the stored magnetic energy to flow back to a DC source through said diodes when said output of said armature current detecting circuit is larger than said reference voltage, while current conduction of said armature coil is restored when said output of said armature current detecting circuit is smaller than said reference voltage by a predetermined value;

said DC source having an output voltage which is set corresponding to output torque and revolutional speed of said motor so that the armature current has a value corresponding to said reference voltage and the current conduction interval of said armature current has a predetermined width;

a third and a fourth current conduction control circuit for performing current conduction of the second-phase armature coil on the basis of said fifth and eighth position detecting signals in the same manner as the armature coil of said first phase; and a fifth and a sixth current conduction control circuit for performing current conduction of the third-phase armature coil on the basis of said sixth and ninth position detecting signals in the same manner as the armature coil of said first phase.

17. A semiconductor electric motor according to claim 16, wherein said first rotary core is provided with an uneven portion at a part of the surface facing said second fixed core and said second core is provided with an additional coil at its surface facing said uneven portion of said first core so that magnetic flux generated from said primary coil of said second core and passed through said secondary coil of said first core causes said additional coil to generate induced electromotive force modulated by said uneven portion, said electromotive force being rectified to obtain said position detecting signals.

18. A semiconductor electric motor according to claim 16, wherein said first rotary core is provided with a magnet magnetized with 2n poles consisting of alternately disposed N and S poles, and said second fixed core is provided with a magnetic sensitive element in opposition to the magnetized surface of said magnet so that the output of said magnetic sensitive element is used as said position detecting signals.

19. A two-phase semiconductor electric motor having field magnetic poles constituting a rotor, said motor comprising:
  a rotor of magnetic material having 2n magnetic poles (n being a positive integer not smaller than 1), said magnetic poles consisting of N and S poles having equal widths and disposed alternately circumferentially;
  a rotary shaft and a bearing for rotatably supporting said rotor;
  an exciting coil for exciting said N and S magnetic poles;
  a rotary transformer including a first and a second soft-ferrite core, said first and second cores having magnetic path open ends and being arranged to rotate relative to each other with said magnetic path open ends facing each other through a slight air gap therebetween, said first core being connected at its central hole with said rotary shaft of said rotor, said second core being fixed to an outer casing;
  a primary and a secondary coil mounted on said second and first cores respectively;
  a high frequency oscillator for supplying said primary coil with a high frequency current;
  an electric circuit for rectifying the output of said secondary coil to thereby energize said exciting coil by said rectified output;
  a fixed armature of magnetic material arranged to face said N and S magnetic poles of said rotor with an air gap therebetween, said fixed armature being provided with two-phase armature coils mounted thereon;
  a first, a second, a third, and a fourth position detecting element for detecting a revolutional position of said rotor to thereby obtain a first, a second, a third, and a fourth position detecting signal, respectively, said first position detecting signal having a waveform repeated every 360 degrees electrical angle in which said first position detecting signal appears at a preceding portion of about 120 degrees and disappears at a succeeding portion of 240 degrees which follows said first portion, said second position detecting signal being a rectangular wave and having a phase difference of 180 degrees relative to said first position detecting signal, said third position detecting signal being a rectangular wave and having a phase delay of 90 degrees relative to said first position detecting signal, said fourth position detecting signal being a rectangular wave and having a phase delay of 90 degrees relative to said second position detecting signal;
  a first and a second transistor bridge circuit having anti-parallelly connected transistors and diodes for controlling current conduction of said two-phase armature coils through said position detecting signals;
  a first current conduction control circuit for energizing the transistors of said first transistor bridge circuit on the basis of said first and second position detecting signals so as to perform current conduction of the first-phase armature coil alternating in directions, said current conduction being effected over a width of 120 degrees substantially at a central portion of an output torque curve over a width of 180 degrees;
  a second current conduction control circuit for comparing the output of an armature current detecting circuit with a reference voltage for commanding output torque so as to control said armature current in said armature coil for every phase such that a current path for said armature coil is cut off at one portion of the current path to cause magnetic energy stored in said armature coil to flow back to said armature through said diode, and cut off at a plurality of portions of said path to cause the stored magnetic energy to flow back to a DC source through said diodes when said output of said armature current detecting circuit is larger than said reference voltage, and current conduction of said armature coil is restored when said output of said armature current detecting circuit is smaller than said reference voltage by a predetermined value;
  said DC source having an output voltage which is set corresponding to output torque and a revolutional speed of said motor so that the armature current has a value corresponding to said reference voltage and the current conduction interval of said armature current has a preset width; and
  a third and a fourth current conduction control circuit for performing current conduction of the second-phase armature coil on the basis of said third and fourth position detecting signals in the same manner as the first-phase armature coil.

20. A semiconductor electric motor according to claim 19, wherein said first rotary core is provided with an uneven portion at a part of its surface facing said second fixed core and said second core is provided with an additional coil at its surface facing said uneven portion of said first core, so that magnetic flux generated from said primary coil of said second core and passed through said secondary coil of said first core causes said additional coil to generate induced electromotive force modulated by said uneven portion, said electromotive force being rectified to obtain said position detecting signals.

21. A semiconductor electric motor according to claim 19, wherein said first rotary core is provided with a magnet magnetized with 2n poles consisting of alternately disposed N and S poles, and said second fixed core is provided with a magnetic sensitive element in opposition to the magnetized surface of said magnet so that the output of said magnetic sensitive element is used as said position detecting signals.

* * * * *

UNITED STATES PATENT AND TRADEMARK OFFICE
CERTIFICATE OF CORRECTION

PATENT NO. : 4,698,563

DATED : October 6, 1987

INVENTOR(S) : Itsuki BAN et al

It is certified that error appears in the above-identified patent and that said Letters Patent is hereby corrected as shown below:

Col. 2, line 34, "ampliiude" should read --amplitude--.

Col. 3, line 20, "eleciric" should read --electric--.

Col. 5, line 34, "armaiure" should read --armature--; and line 63, "3b" should read --2b--.

Col. 6, line 8, "ihe" should read --the--; and line 36, "wiih" should read --with--.

Col. 7, line 18, after "armature" insert --8--.

Col. 8, line 43, "increases" should read --increased--.

Col. 9, line 14, "FG frequency" should read --FG (frequency--.

Col. 16, line 18, "ihe" should read --the-.

Col. 17, line 10 "l and 44d" (italicized) should read --and 44d-- (without italicization);

line 34, "ihe" should read --the--;

line 47 and 55 "58b" should read --53b--; and line 68 "38a" should read --36a--.

UNITED STATES PATENT AND TRADEMARK OFFICE
CERTIFICATE OF CORRECTION

PATENT NO. : 4,698,563
DATED : October 6, 1987
INVENTOR(S) : Itsuki BAN et al

PAGE 2 OF 5

It is certified that error appears in the above—identified patent and that said Letters Patent is hereby corrected as shown below:

Col. 18, line 9, "circuiis" should read --circuits--.

Col. 20, line 47, "50a" should read --50a--; and line 55, "FIGS." should read --FIG.--.

Col. 21, line 60, "ouiwards" should read --outwards--;

line 62, "3f3g" should read --3f, 3g--; and line 63, "circuit" should read --circuits--.

Col. 22, line 64, after "45d" insert --are--.

Col. 23, line 20, "reciifier-smoothing" should read --rectifier-smoothing--; and line 25, "90b" should read --90b--.

Col. 24, line 29, "ecomes" should read --becomes--;

line 37, "while" should read --while--;

line 63, "38" should read --36--; and line 68, "in arma-" should read --in the arma- --.

Col. 25, line 1, after "ture" insert --coils--; and line 40, "F/V" should read --FV--.

UNITED STATES PATENT AND TRADEMARK OFFICE
CERTIFICATE OF CORRECTION

PATENT NO. : 4,698,563
DATED : October 6, 1987
INVENTOR(S) : Itsuki BAN et al

It is certified that error appears in the above—identified patent and that said Letters Patent is hereby corrected as shown below:

Col. 26, line 16, "76b" should read --72b--;

line 66 "32e", first occurrence, should read --32d--; and line 68, "72a72b" should read --72a and 72b--.

Col. 27, line 4, "Terminal" should read --Terminals--;

line 7, "terminal" should read --terminals--;

line 8, "72a72b" should read --72a and 72b--;

line 16, "ad" should read --and--;

line 24 "terminal" should read --terminals--;

line 30, "32a32b" should read --32a and 32b--; and line 50 "ourves" should read --curves--.

Col. 28, line 55, "genile" should read --gentle--.

Col. 30, line 20 "76b" should read --75b--.

Col. 31, line 3, "20bare" should read --20b are--.

Col. 32, line 15, "wiih" should read --with--;

line 67, "is" should read --in--; and

UNITED STATES PATENT AND TRADEMARK OFFICE
CERTIFICATE OF CORRECTION

PATENT NO. : 4,698,563

DATED : October 6, 1987

INVENTOR(S) : Itsuki BAN et al

It is certified that error appears in the above—identified patent and that said Letters Patent is hereby corrected as shown below:

line 68, "ar" should read --are--.

Col. 33, line 28 "18)c)" should read --18(c)--.

Col. 34, line 34, delete the comma ","; and line 62, "wiih" should read --with--.

Col. 35, line 66, delete "thereof".

Col. 36, line 54, "ampliiude" should read --amplitude--.

Col. 37, line 5, "liiplier" should read --ltiplier--; and line 58, delete "by".

Col. 39, line 60 after "sets" insert --of--.

Col. 40, line 15, after "sets" insert --of--;

line 24, "circuitr" should read --circuit--;

line 47, "wiih" should read --with--; and line 56, "wiih" should read --with--.

UNITED STATES PATENT AND TRADEMARK OFFICE
CERTIFICATE OF CORRECTION

PATENT NO. : 4,698,563

DATED : October 6, 1987

INVENTOR(S) : Itsuki BAN et al.

It is certified that error appears in the above-identified patent and that said Letters Patent is hereby corrected as shown below:

Col. 41, line 2, "tialy" should read --tially--.

Col. 44, line 11, "directions" should read --direction--.

Signed and Sealed this

Seventeenth Day of May, 1988

Attest:

DONALD J. QUIGG

Attesting Officer

Commissioner of Patents and Trademarks